United States Patent
Sumi

(10) Patent No.: US 7,440,050 B2
(45) Date of Patent: Oct. 21, 2008

(54) REFLECTIVE STRUCTURE HAVING A DIRECTIVITY OF DIFFUSE REFLECTION AND APPARATUS WITH IT

(75) Inventor: Naoki Sumi, Kobe (JP)

(73) Assignee: TPO Hong Kong Holding Limited, Shatin, Hong Kong SAR (CN)

( * ) Notice: Subject to any disclaimer, the term of this patent is extended or adjusted under 35 U.S.C. 154(b) by 245 days.

(21) Appl. No.: 10/571,625

(22) PCT Filed: Sep. 14, 2004

(86) PCT No.: PCT/IB2004/051748

§ 371 (c)(1),
(2), (4) Date: Mar. 14, 2006

(87) PCT Pub. No.: WO2005/026791

PCT Pub. Date: Mar. 24, 2005

(65) Prior Publication Data

US 2007/0091231 A1    Apr. 26, 2007

(30) Foreign Application Priority Data

Sep. 15, 2003   (WO) ................. PCT/IB03/04165

(51) Int. Cl.
*G02F 1/1335* (2006.01)
(52) U.S. Cl. ........................... 349/113; 349/112
(58) Field of Classification Search .............. None
See application file for complete search history.

(56) References Cited

U.S. PATENT DOCUMENTS

2002/0067445 A1   6/2002   Tsai et al.
2003/0142247 A1 *  7/2003   Nishiyama et al. ............ 349/67
2003/0218698 A1   11/2003  Otake et al.

FOREIGN PATENT DOCUMENTS

EP    0883015    12/1998
EP    0921440    6/1999

OTHER PUBLICATIONS

PCT International Search Report of Counterpart PCT Application No. PCT/IB2004/051748.

* cited by examiner

*Primary Examiner*—Frank G Font
*Assistant Examiner*—Eric Wong
(74) *Attorney, Agent, or Firm*—Liu & Liu

(57) ABSTRACT

An object of the invention is to provide a reflective structure which can cause diffused reflecting light to have a desired directivity more reliably and an apparatus with it. An optical diffusing reflective structure 1 having an optical reflective layer 20 whose surface is roughened and which is supported by a base layer 10. The optical reflective layer 20 comprises mesh potions 2h arranged in mesh form and each having one shape of a cave and a rise and a net portion 2M continuously extending around these mesh portions 2h in net form and having the other shape of a cave and a rise. The net portion 2M is classified in a plan view into a first extending elements Po' extending in a predetermined first direction #1 and in a second direction #2 that intersects the first direction #1 almost at a right angle and a second extending elements Ps' extending substantially at 45° with respect to the first and second directions #1 and #2. The first and second extending elements Po' and Ps' have the respective substantially constant widths, and widths of the first extending elements Po' are greater than widths of the second extending elements Ps' to have greater effective reflective surface area per unit extending length.

20 Claims, 20 Drawing Sheets

[Fig. 1]
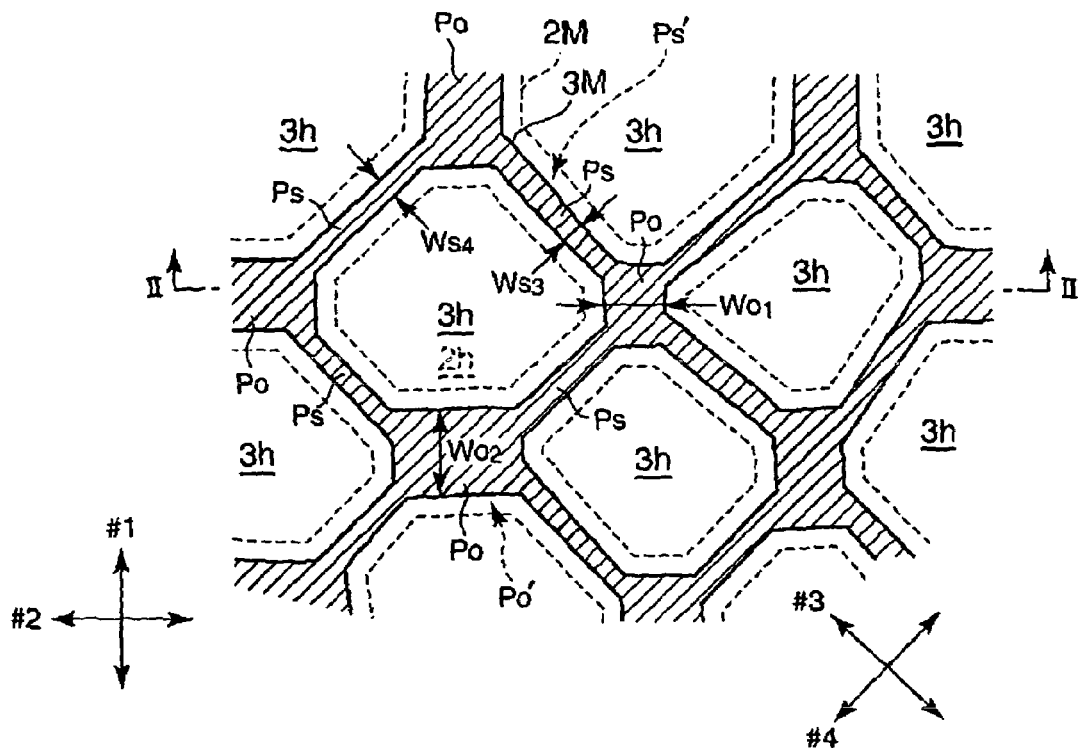
[Fig. 2]
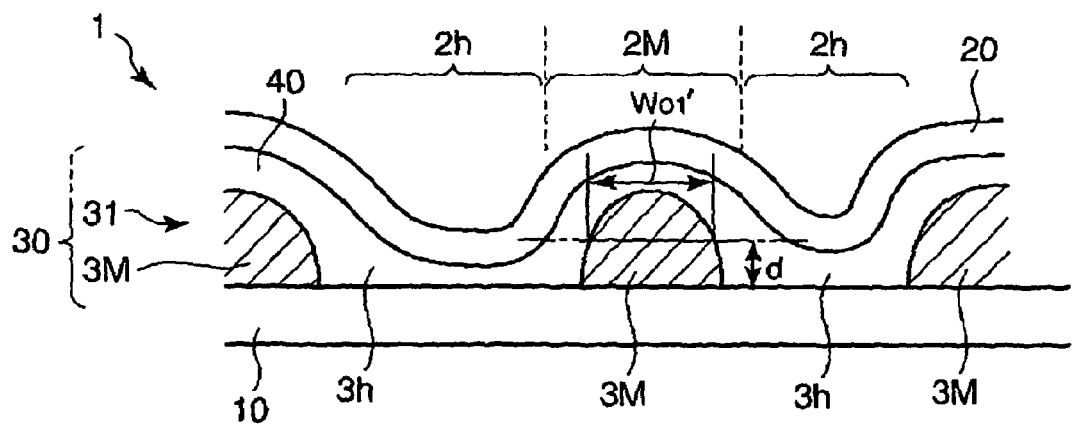

[Fig. 3]
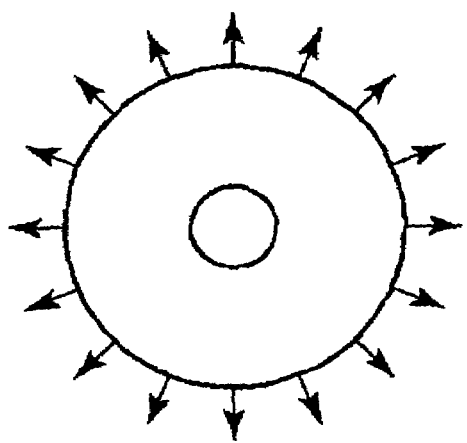
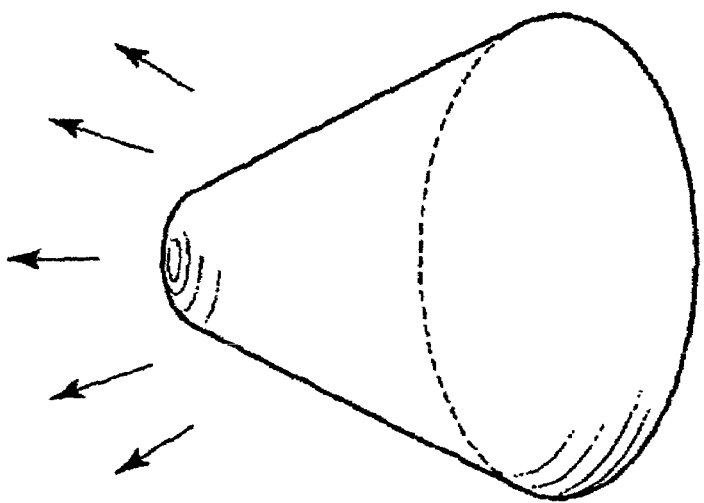
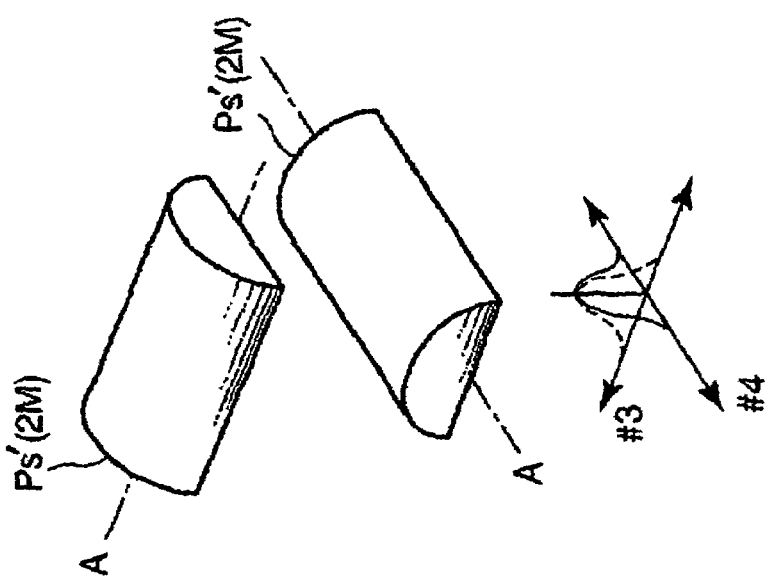

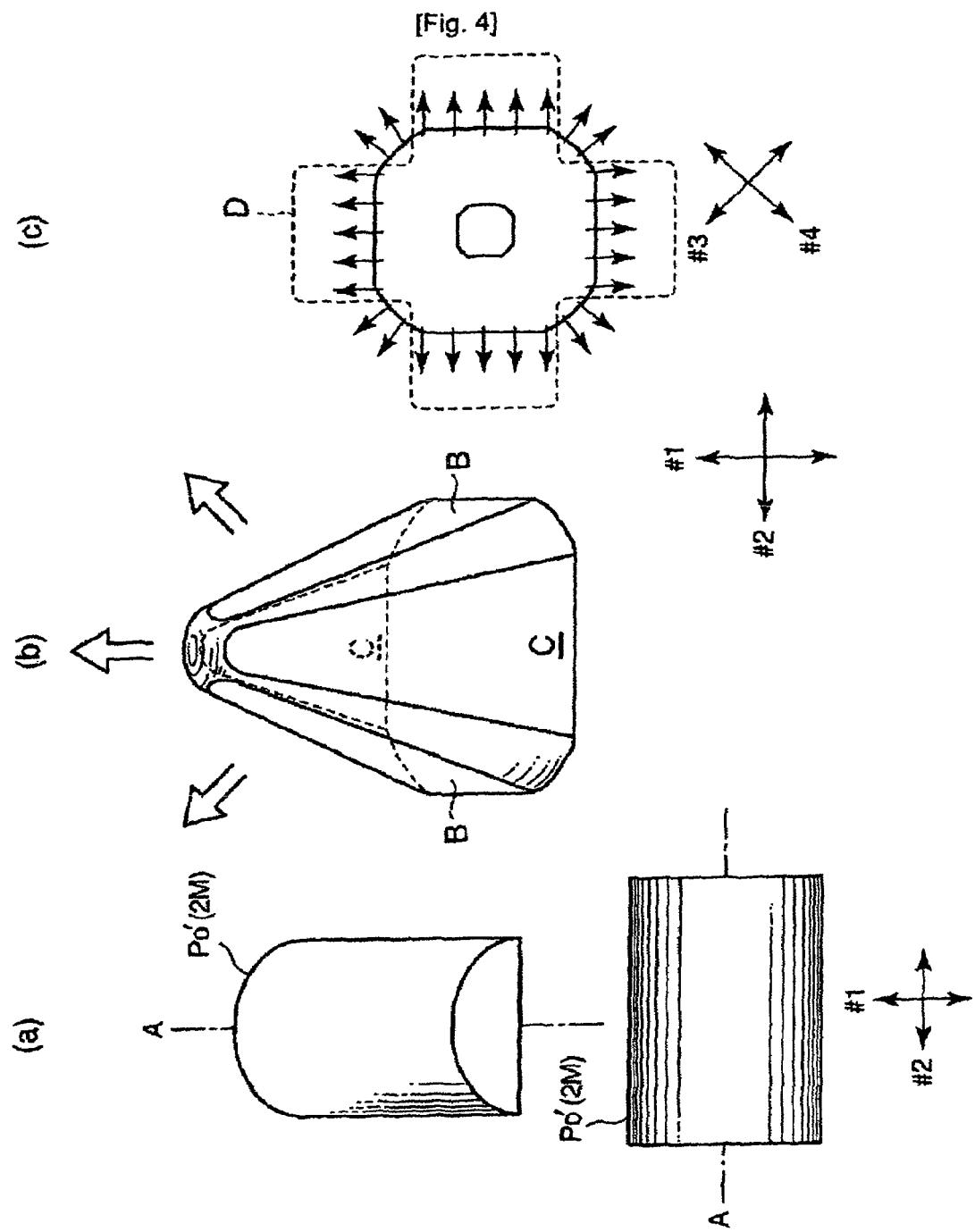

[Fig. 5]
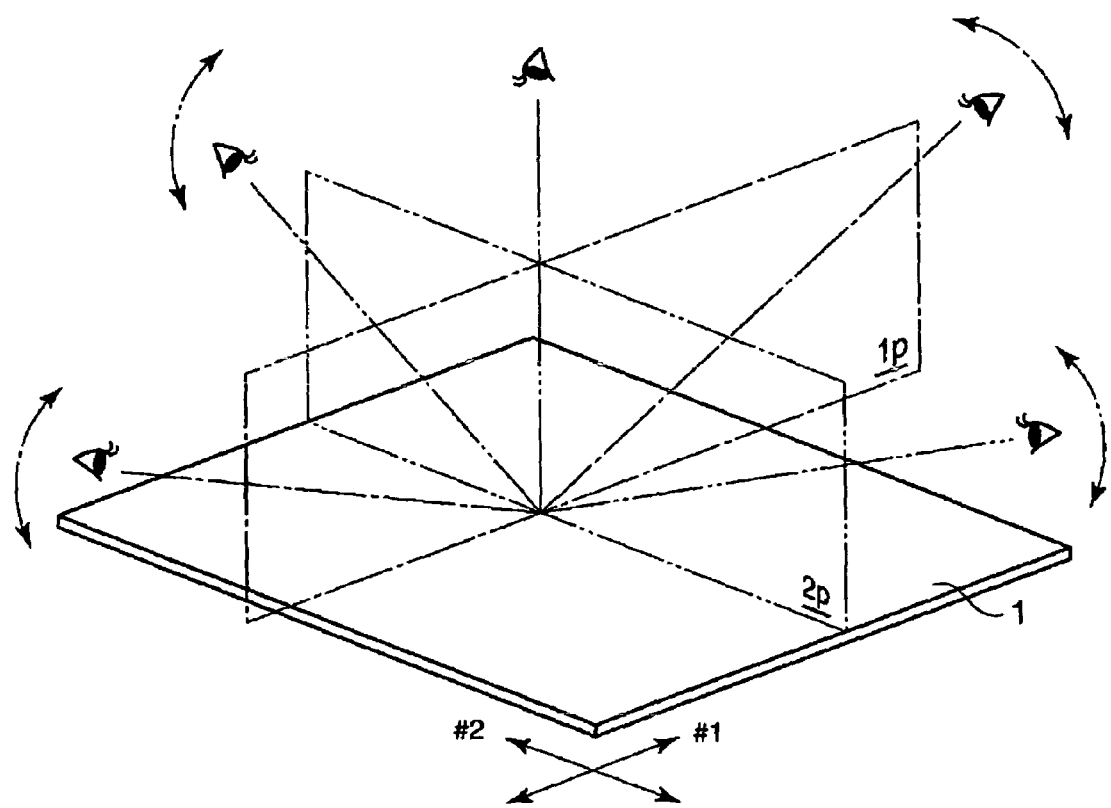

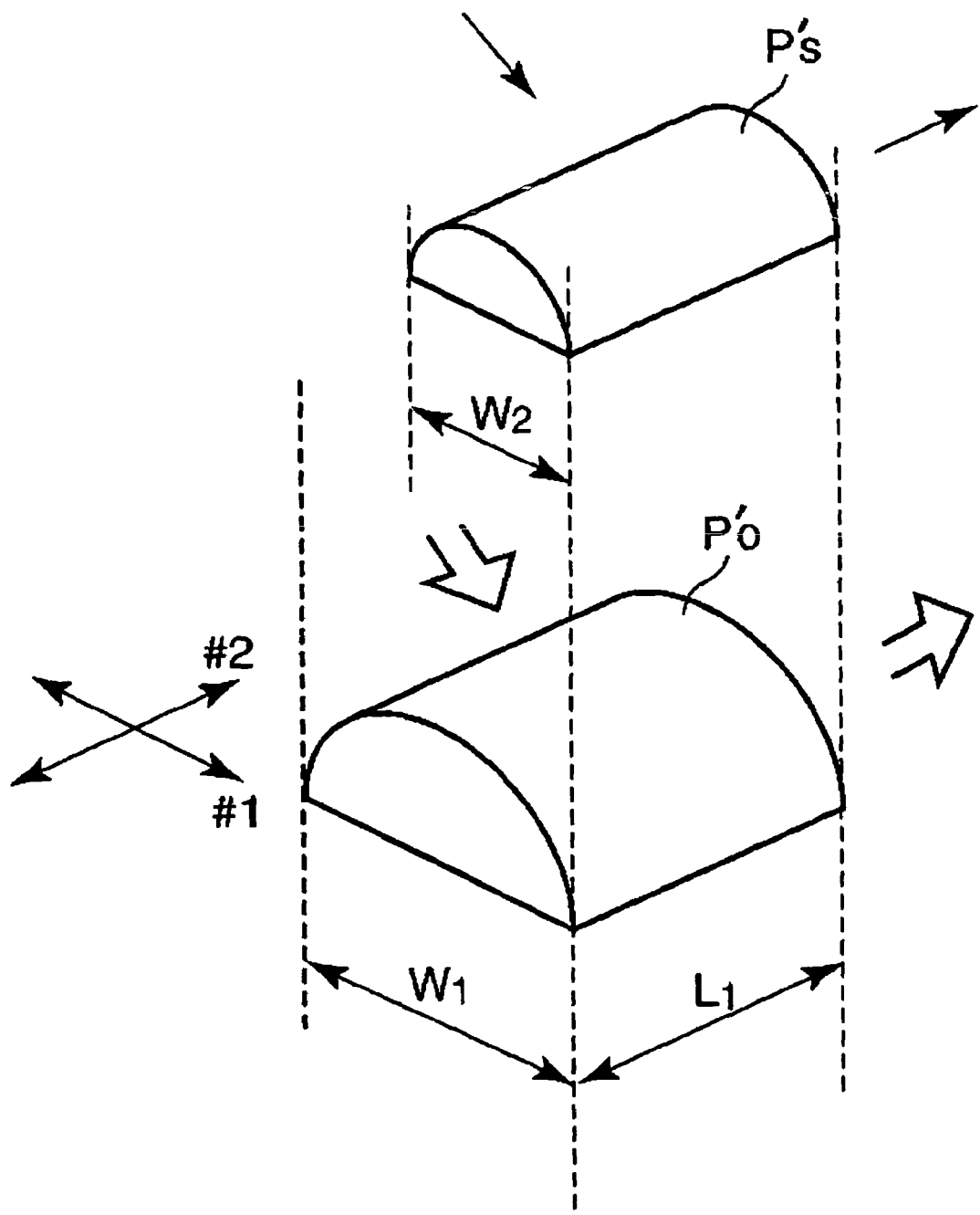
[Fig. 6]

[Fig. 7]
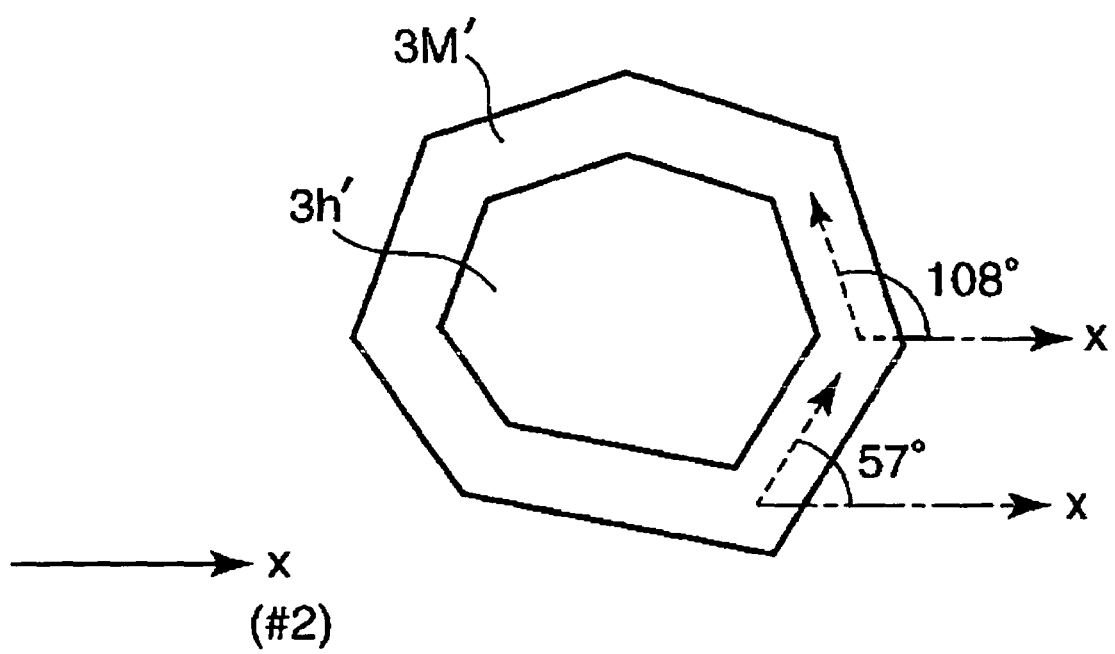

[Fig. 8]
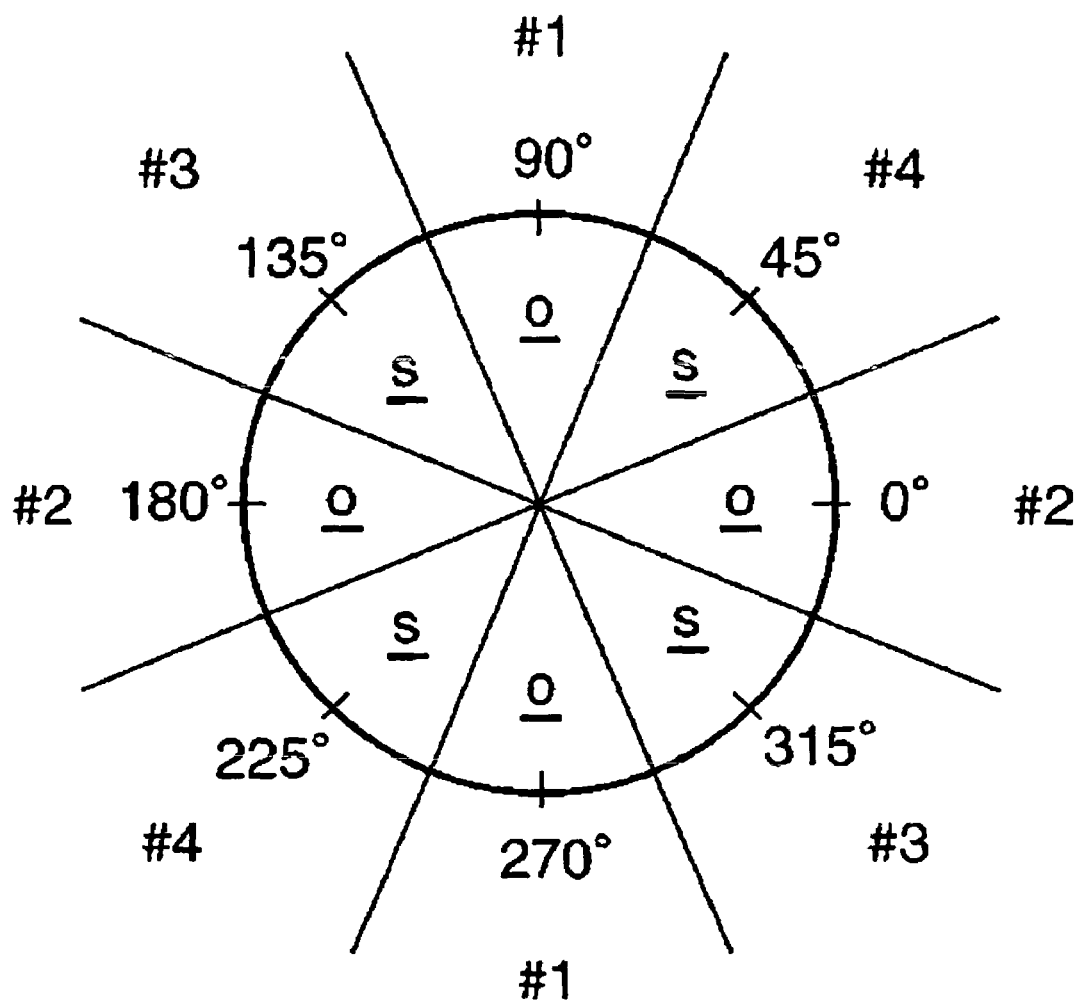

[Fig. 9]
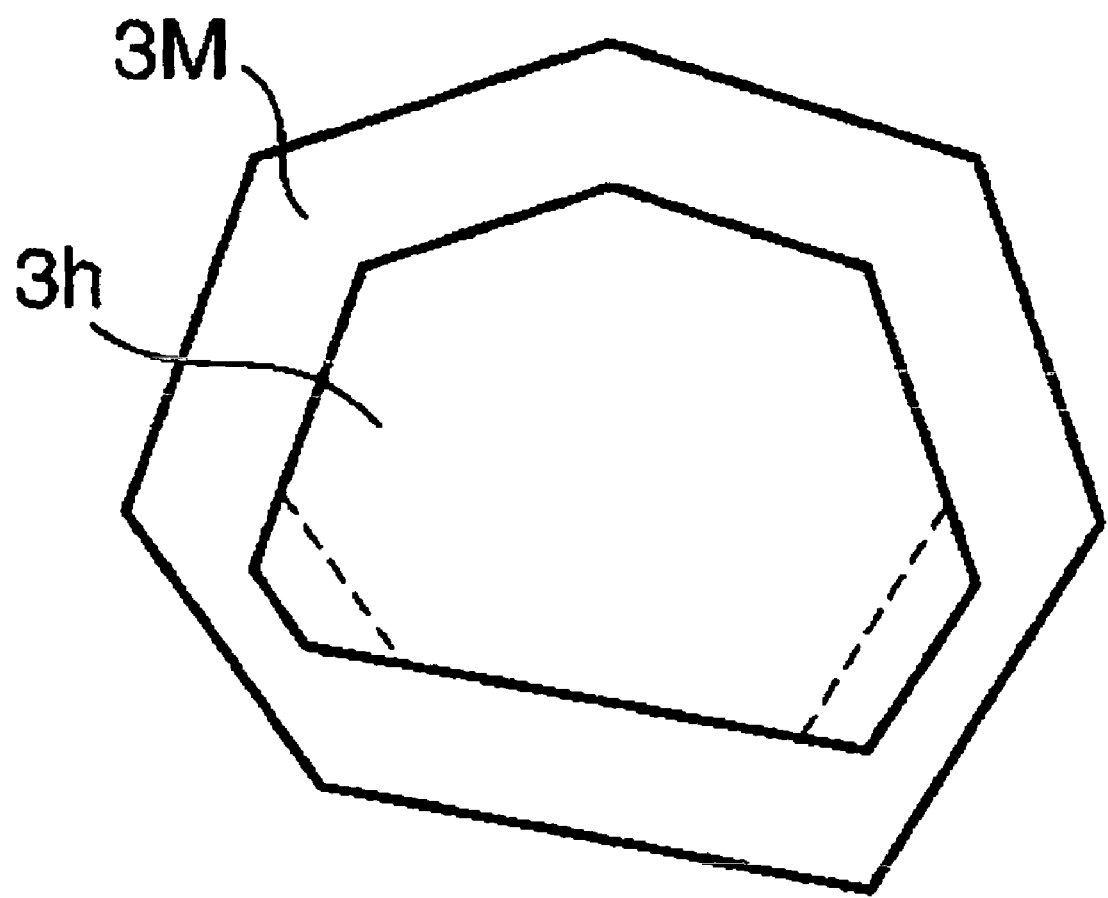

[Fig. 10]
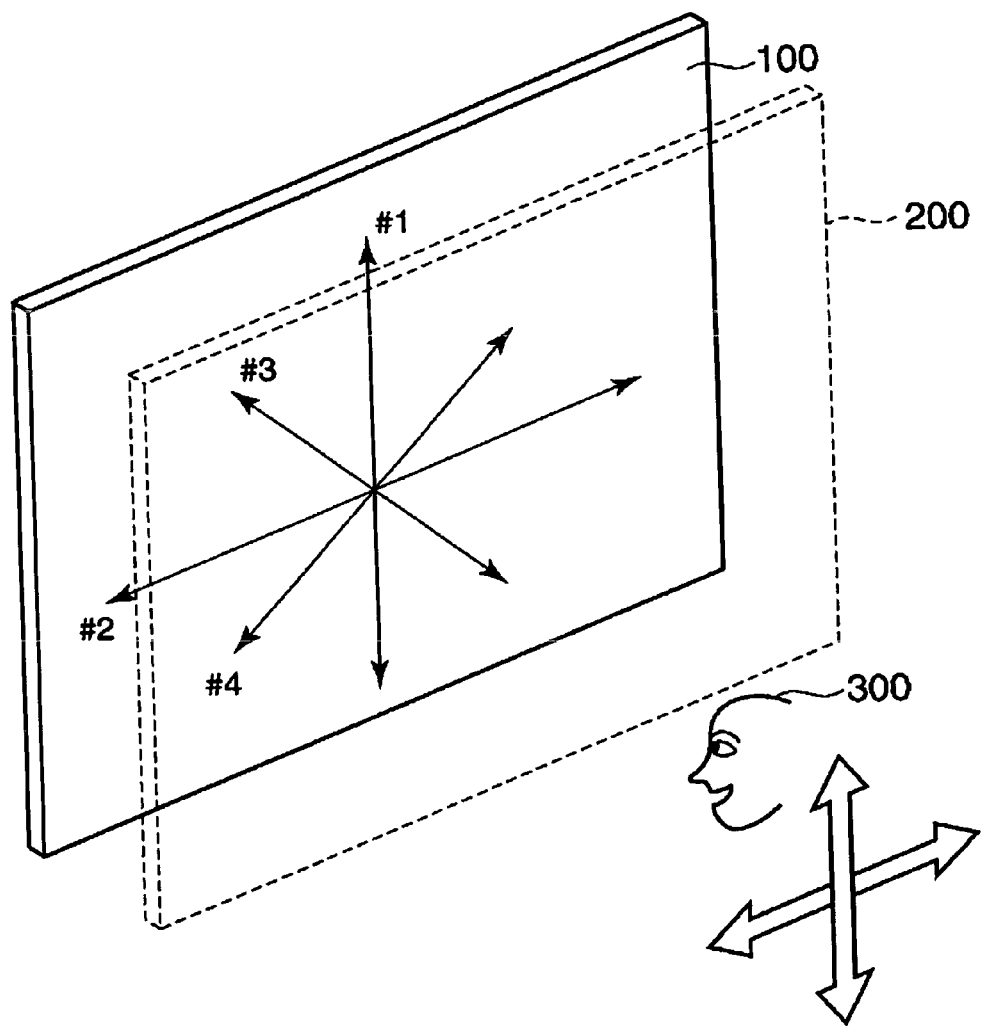

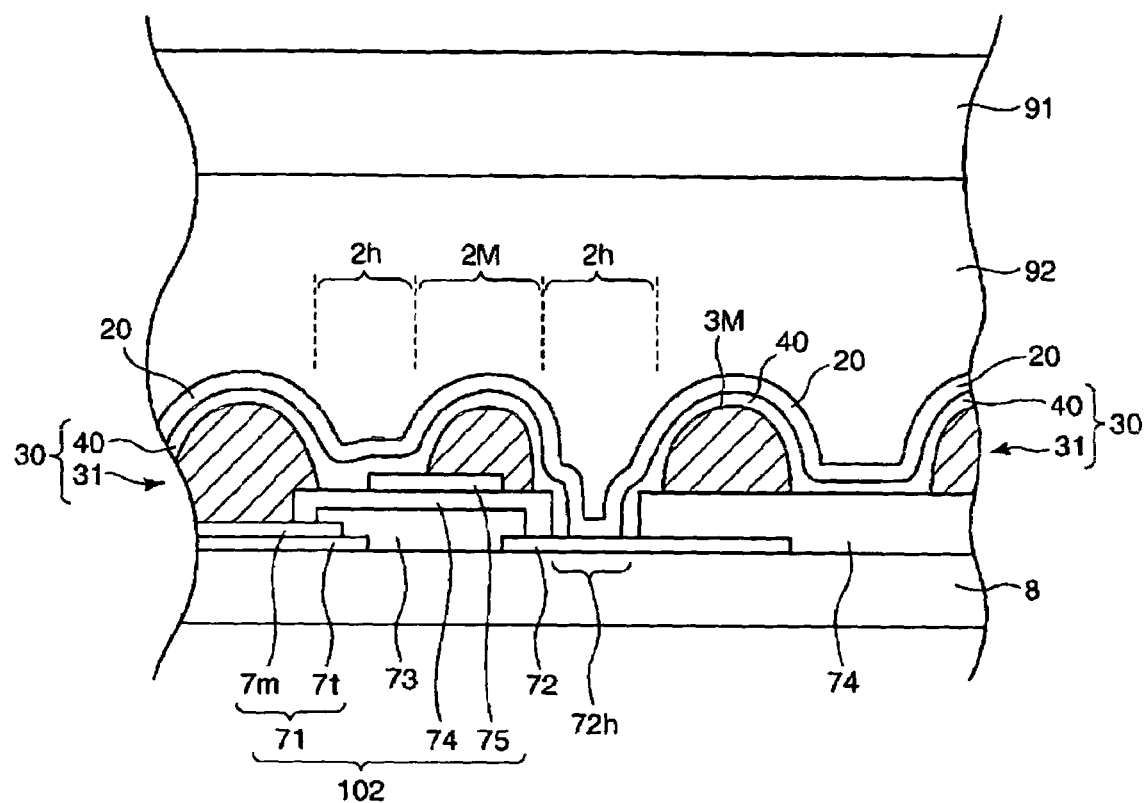
[Fig. 11]

[Fig. 12]
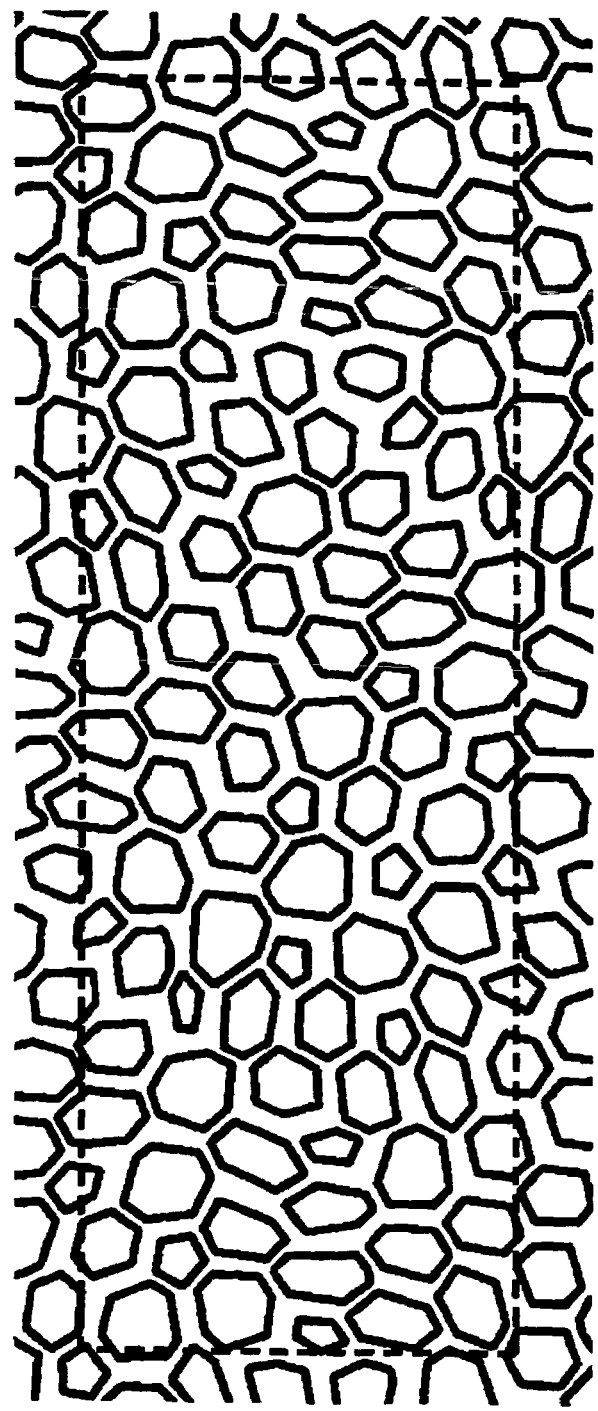

[Fig. 13]
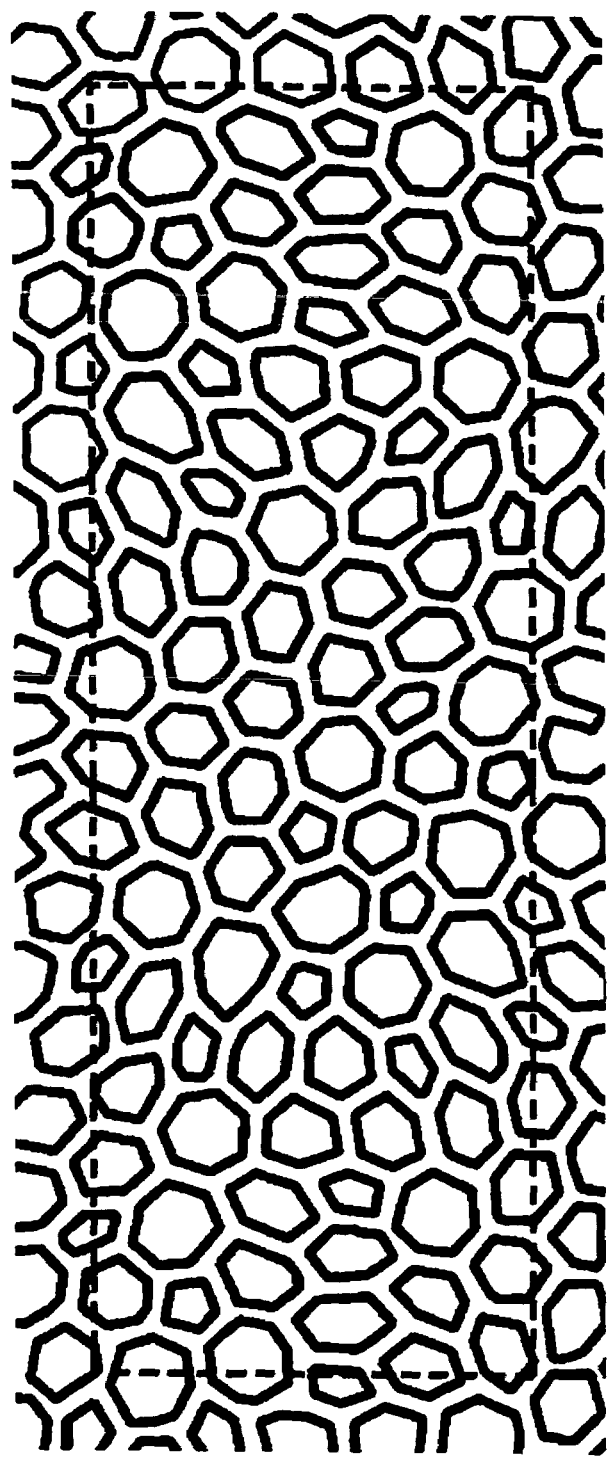

[Fig. 14]
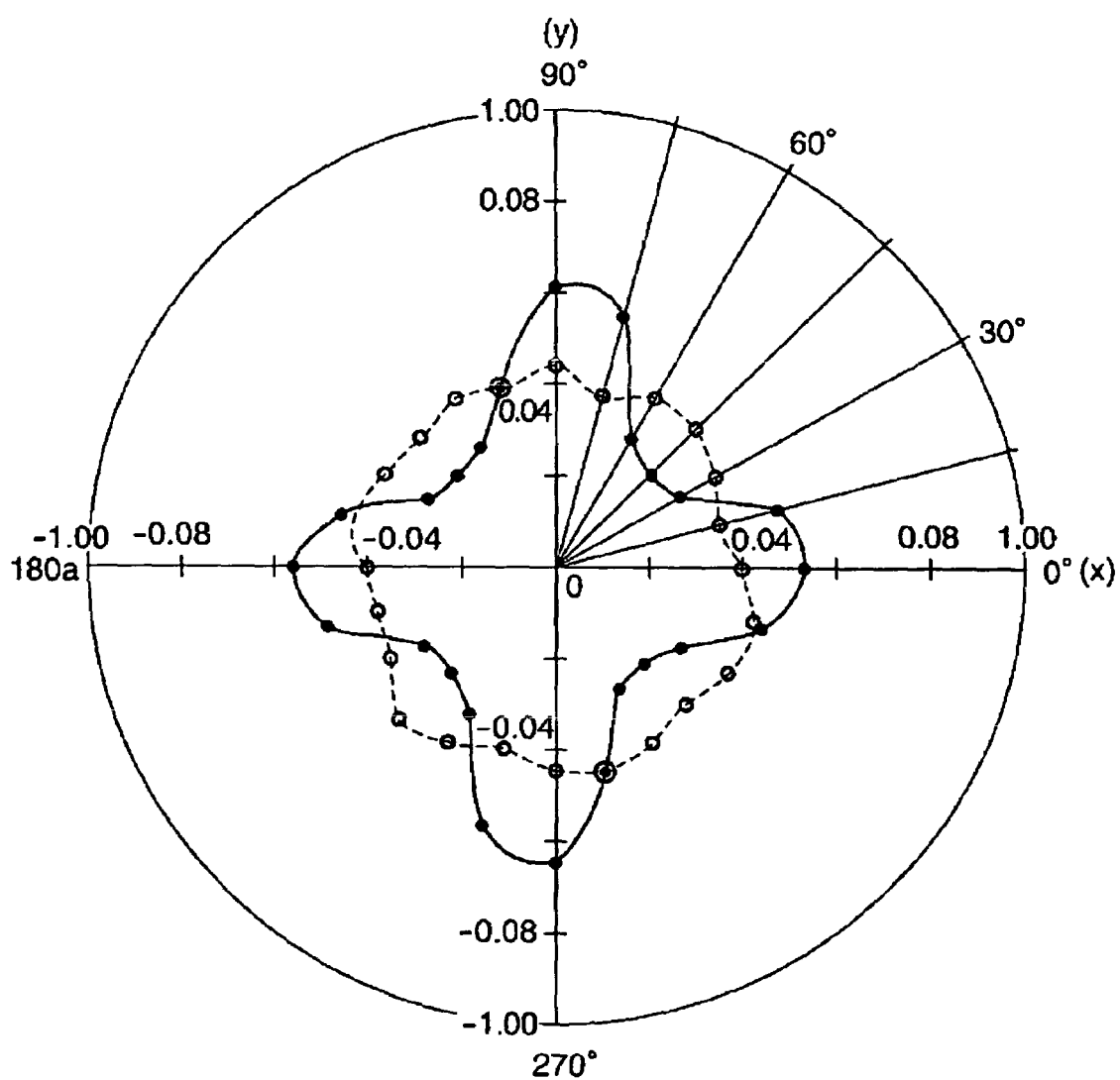

[Fig. 15]
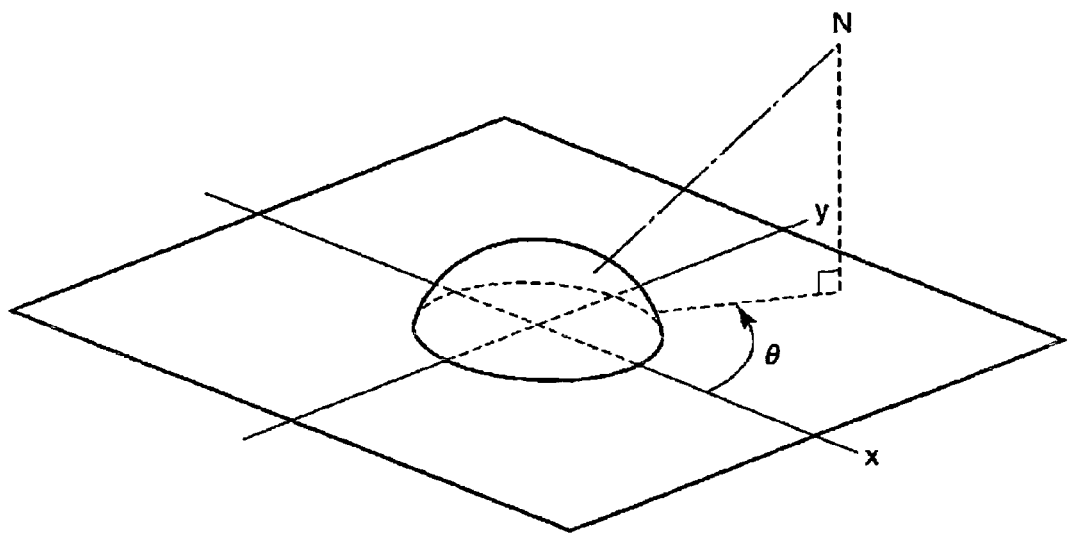
[Fig. 16]
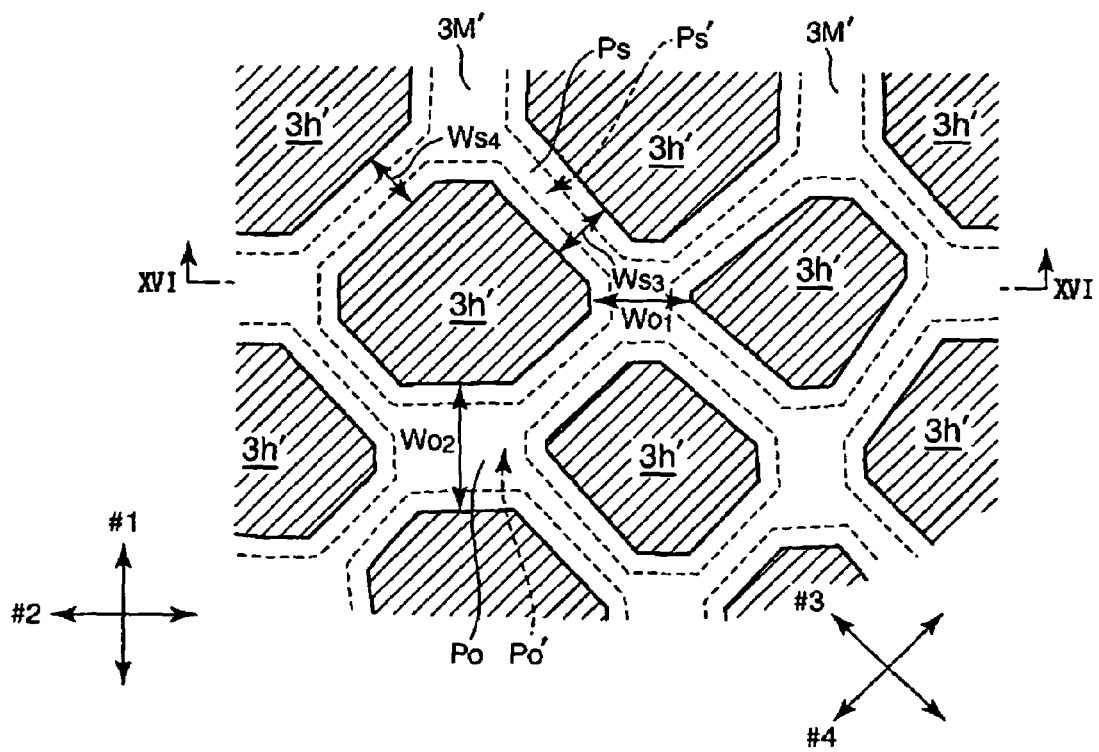

[Fig. 17]
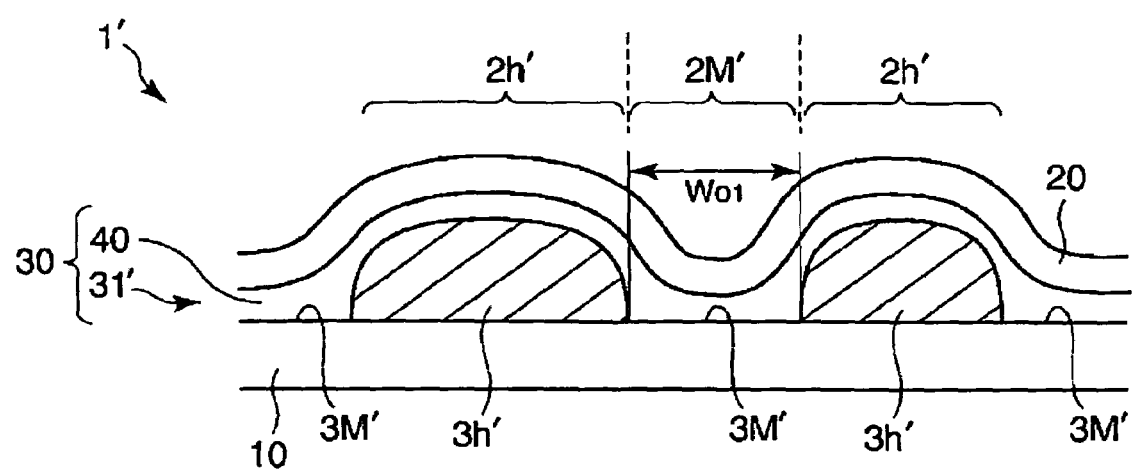

[Fig. 18]
(a)
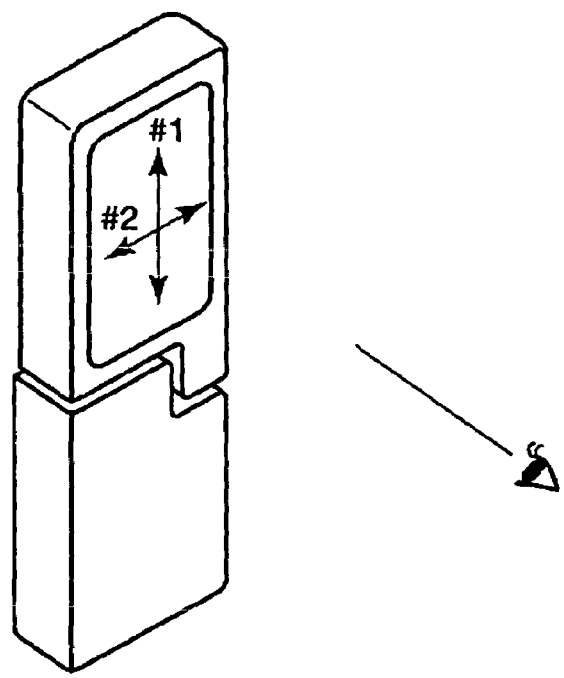
(b)
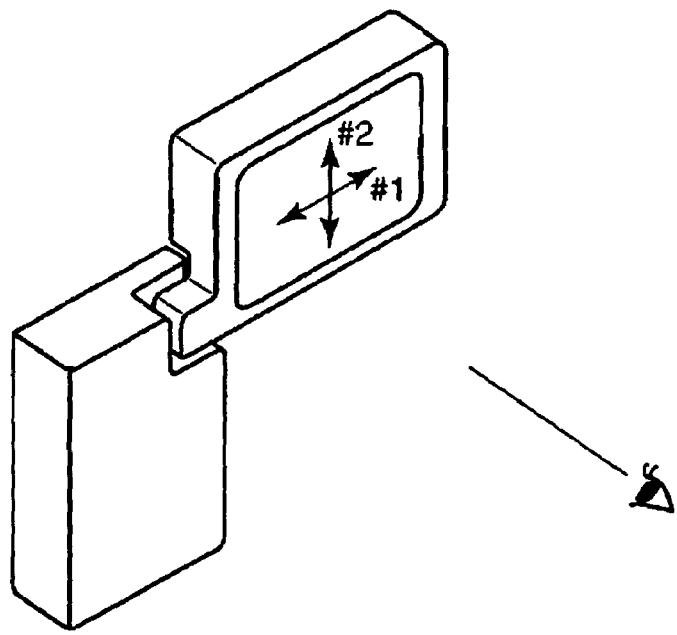

[Fig. 19]
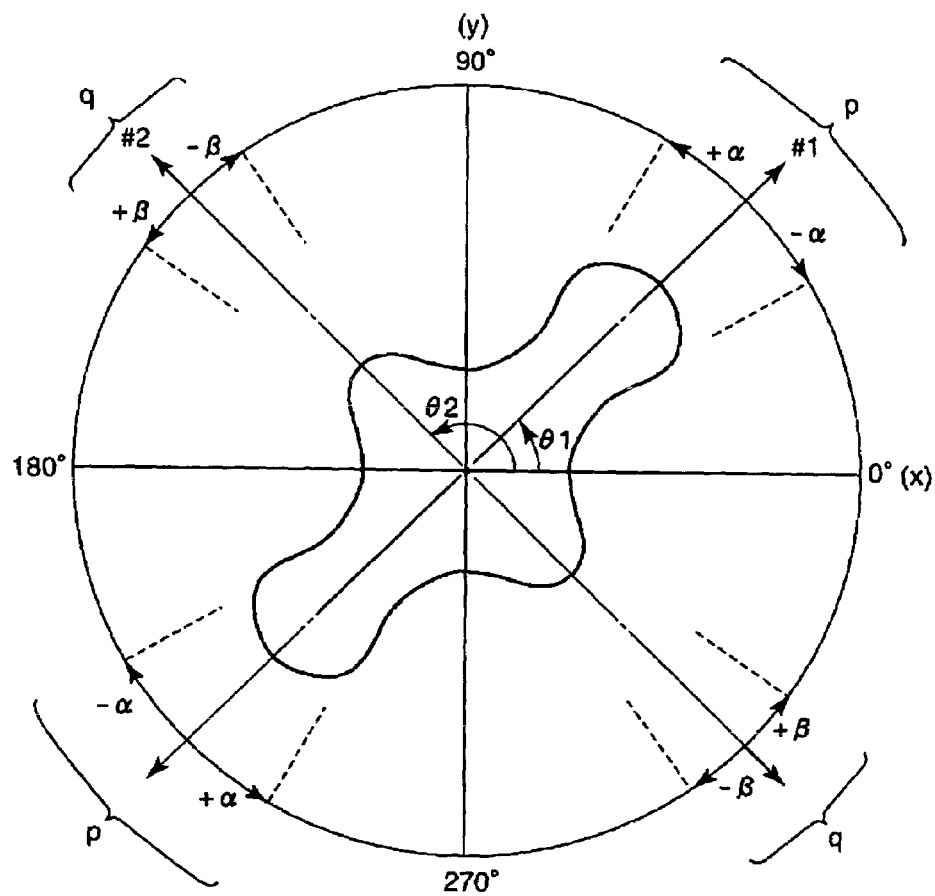
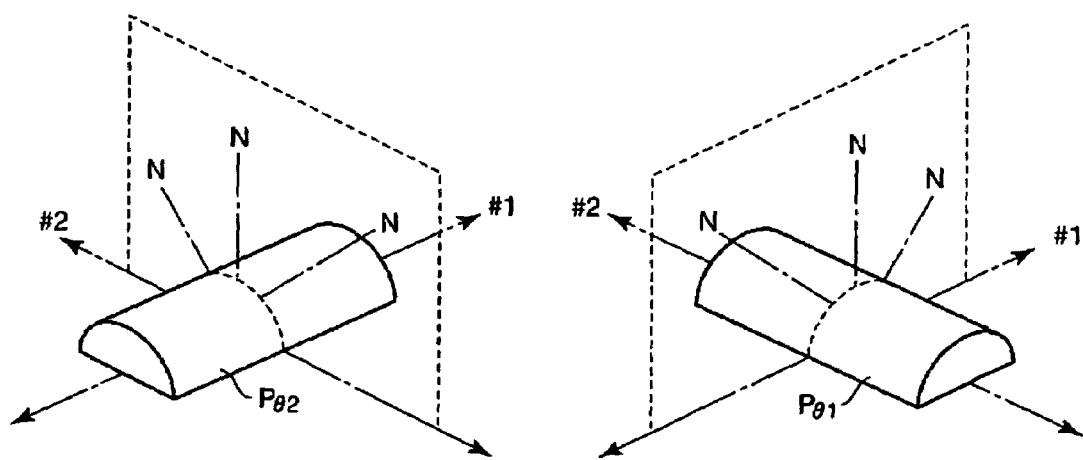

[Fig. 20]
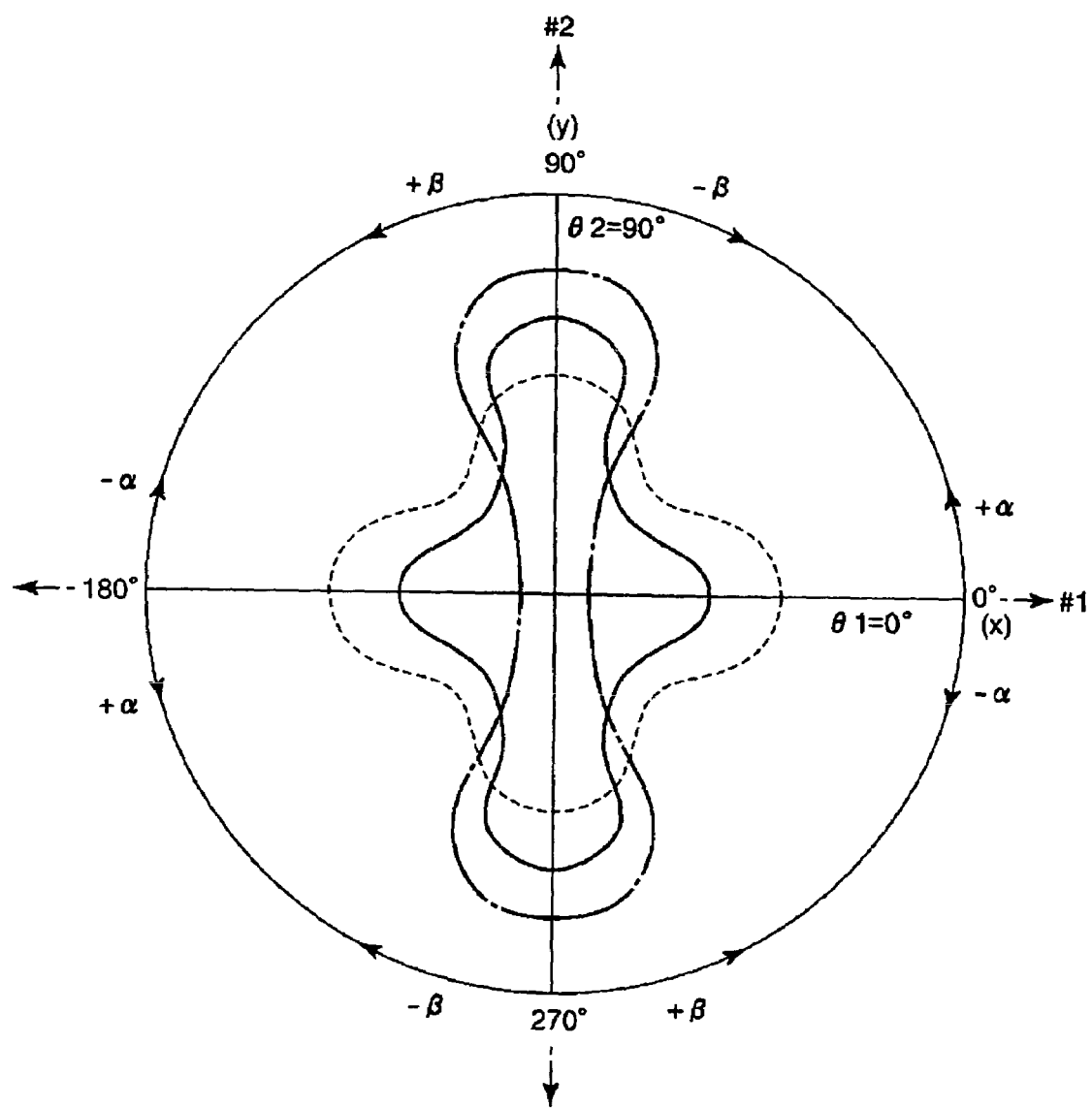

[Fig. 21]
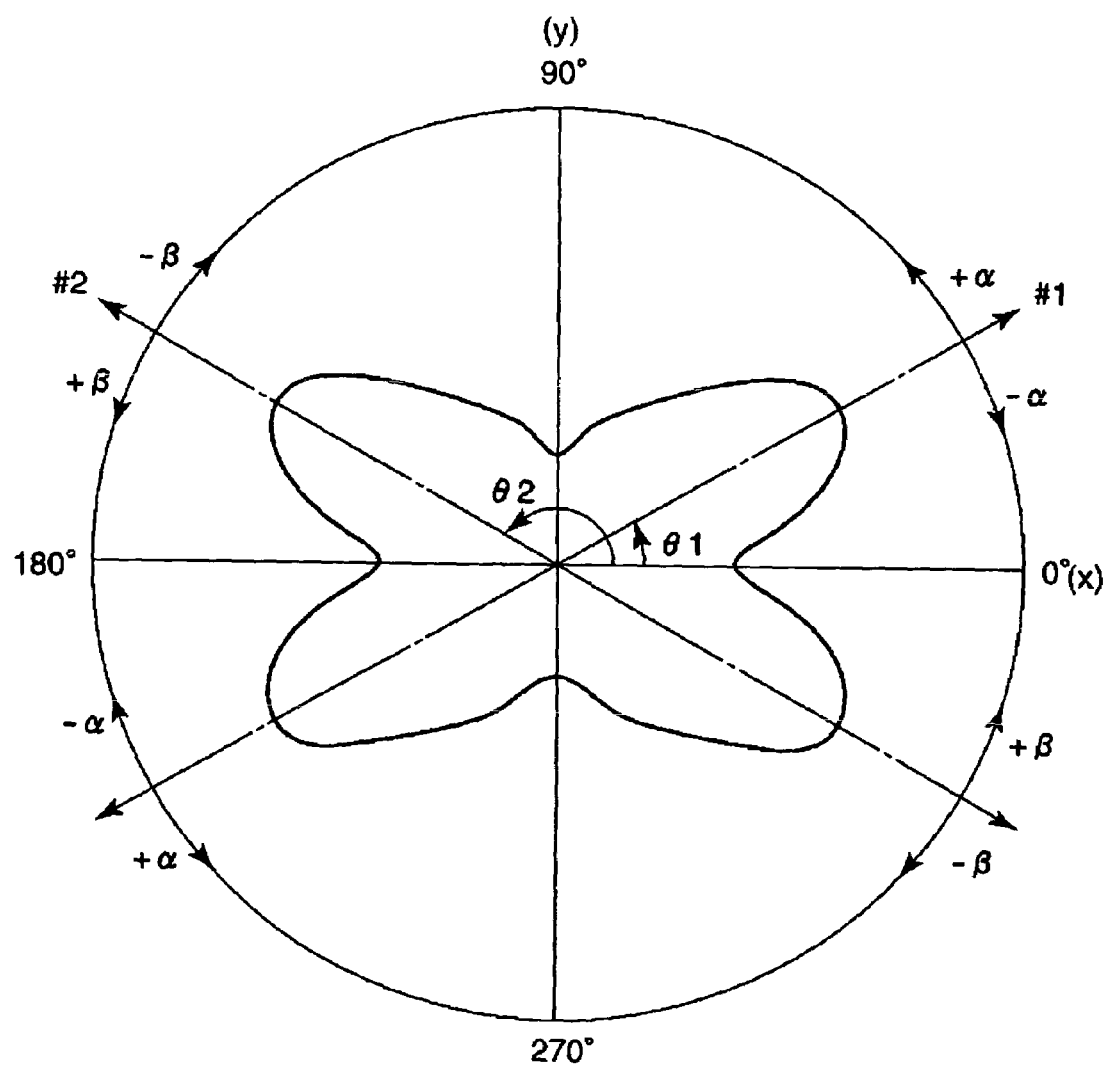

[Fig. 22]
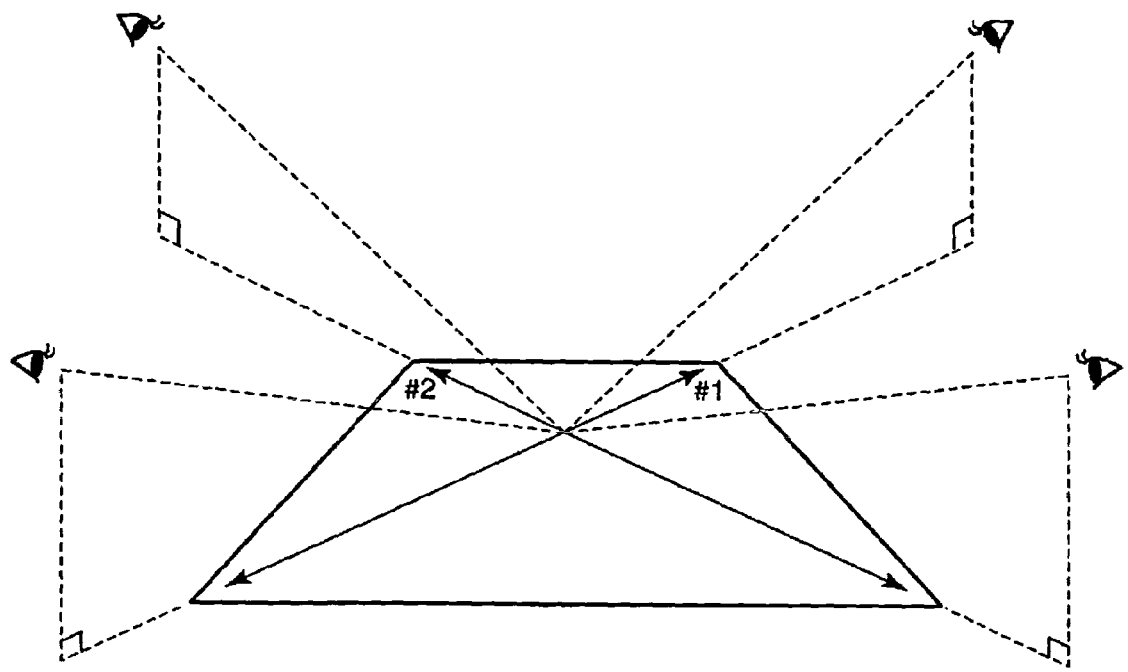

US 7,440,050 B2

REFLECTIVE STRUCTURE HAVING A DIRECTIVITY OF DIFFUSE REFLECTION AND APPARATUS WITH IT

TECHNICAL FIELD

The present invention relates to a reflective structure that diffuses and reflects incident light. More specifically, the invention relates to a reflective structure capable of causing diffused reflecting light to have a directivity. The invention also relates to an apparatus provided with such a reflective structure, and in particular to a liquid crystal display device of reflective type, transflective type or the like.

BACKGROUND ART

There is a report on the development of a reflective type color TFT-LCD using a vertically aligned (VA) liquid crystal, having high reflectance (42%) and a high contrast ratio (80:1) (Non-Patent Document 1). This Non-Patent Document also reports that an MVA (Multi-domain Vertical Alignment) liquid crystal has been adopted as the VA liquid crystal and a low-cost reflective type color TFT-LCD having high display performance has been successfully implemented using a wrinkle diffusing reflective electrode through a newly developed photomask-less process.

This wrinkle diffusing reflective electrode is formed as follows. A photosensitive resin layer is formed on a TFT substrate, exposure to light is performed using a photomask for forming contact holes, and the photosensitive resin layer is developed to form contact holes. Next, the remaining resin is irradiated with UV light without any photomask. In this case, a shrinkage ratio distribution is formed in a single layer of photosensitive resin by adjusting UV intensity and spectral characteristics to make the shrinkage ratio of its lower layer greater than that of its upper layer. Then, a baking process is performed to shrink the resin having a shrinkage ratio distribution in the thickness direction, and to form wrinkle-shaped projections and depressions on the surface, and finally a metal layer having high light reflectance such as Al is formed on these wrinkle-shaped projections and depressions to manufacture a diffusing reflective electrode having a wrinkle-shaped surface similar to the projections and depressions.

This Non-Patent Document also refers to control of a reflective characteristic in a direction of the wrinkle-shaped projections and depressions. This refers to the fact that it is possible to make incident light to be reflected only in a specific direction by controlling a direction of the wrinkle-shaped projections and depressions. More specifically, a direction of the wrinkle-shaped projections and depressions is controlled by changing conditions of an interface between the photosensitive resin layer and the substrate to obtain directional reflection characteristics having high reflectance in vertical and horizontal directions.

However, this shape of the wrinkle-shaped projections and depressions largely depends on not only the thickness of the photosensitive resin and UV irradiation energy but also other various manufacturing parameters, and it is therefore assumed that it would not be simple to manufacture a desired shape reliably. Furthermore, even if optimum parameters are found and the product is manufactured according to these parameters, it is often the case where unexpected fluctuations of the parameters occur in the actual manufacturing flow, whereby the desired shape can not be formed stably, in particular variations among the products are easy to result.

[Non-Patent Document 1]
Norio Sugiura et al., 'Reflective Color TFT-LCD using MVA Technology', Liquid Crystal (EKISHO) Vol. 6, No. 4, 2002, Japanese Liquid Crystal Society, issued on Oct. 25, 2002, pp. 383-389

DISCLOSURE (Object)

The present invention has been implemented in view of the above-described circumstances and its object is to provide a reflective structure which can cause diffused reflecting light to have a desired directivity more reliably and an apparatus with it, and to provide manufacturing methods for them.

Another object of the invention is to provide a reflective structure which is simple, has a stable form and can provide more uniform quality of products, and an apparatus with it, and manufacturing methods for them, without relying on any complicated manufacturing methods.

(Constitution)

In order to attain these objects, a reflective structure according to one aspect of the present invention is an optical diffusing reflective structure having an optical reflective layer whose surface is roughened, wherein: the optical reflective layer comprises mesh potions arranged in mesh form and each having one shape of a cave and a rise and a net portion continuously extending around these mesh portions in net form and having the other shape of a cave and a rise; the net portion is classified in a plan view into first extending elements extending in a predetermined first direction and in a second direction that intersects the first direction at a predetermined angle and second extending elements extending in midway directions between the first and second directions; the first and second extending elements have the respective substantially constant widths; and elements of the first elements extending in at least one of the first and second directions are greater in effective reflective surface area per unit extending length than the second extending elements.

By adopting such a structure, it is possible to make various directivities of diffuse reflection with only a relativity between values of the effective reflective surface areas of mainly the first and second extending elements, and therefore it is possible to reliably realize desired diffusive reflection directivity. Furthermore, the mesh portions and net portion of such a reflective structure can have the same form and layout pattern for all products without relying on unexpected wrinkle-shaped patterns as in the case of the aforementioned prior art, and can thereby avoid variations in quality from one product to another due to this reflective structure.

In this aspect, elements of the first extending elements extending in the first direction may be different in the effective reflective surface area per unit extending length from elements of the first extending elements extending in the second direction. This also allows the reflected light distribution to differ between the first direction and second direction.

Furthermore, the midway direction may be an angular direction bisecting an angle enclosed by the first direction and the second direction. This allows a reflected light distribution in the midway direction to be inferior to that in the first and second directions but in balanced form.

Here, the predetermined angle may be 90° or other than 90°. In either case, it is possible to reduce the degree of contribution of the second extending elements to reflection on one hand, and increase the degree of contribution of the first extending elements to reflection on the other. Directivities obtained may be orthogonal cross-shaped, ellipsoidal, non-orthogonal cross-shaped or a mixture of these shapes.

In the above-mentioned first to fourth embodiments, the effective reflective surface area may be defined by a width of the extending element, whereby the effective reflective surface area can be easily set.

Furthermore, in this embodiment, the first and second directions can correspond to a horizontal direction and a vertical direction in a front view of a major surface of the reflective structure. This allows a viewer viewing the major surface of the reflective structure to see the reflected light with relatively high intensity even if the view point is moved in horizontal and vertical directions. The scope of such applications is expected to be wide, and therefore this mode is useful.

Furthermore, if the mesh portion has substantially a polygonal shape in a plan view, there may be an advantageous feature in terms of pattern design, and if there is provided an uneven underlayer for defining a shape of roughened surface of the optical reflective layer under the optical reflective layer, it is possible to provide a multilayered reflective structure.

Furthermore, the reflective structure can also be adapted so that the first and second extending elements consist of extending elements having reflective surfaces on which the normal can stand at any directional angle within ranges of $\theta 1+180°'' n\pm\alpha$ and $\theta 2+180°'' n\pm\beta$ (n=0, 1), respectively, where $\theta 1$ and $\theta 2$ are directional angles corresponding to the first and second directions, respectively, and $\alpha$ and $\beta$ are predetermined angles larger than 0°, respectively. This ensures that a desired reflected light distribution is provided relative to arbitrary first and second directions. That is, it is possible to identify individual or various extending elements extending in various directions as the first extending elements and second extending elements based on the relevant expressions of range and set appropriate effective reflective surface areas for the respective elements. When $\alpha > \beta$, the distribution of the reflected light in the first direction becomes predominant over that in the second direction, and when $\alpha < \beta$, the distribution of the reflected light in the second direction becomes predominant over that in the first direction.

In order to attain the above described objects, the apparatus using a reflective structure according to another aspect of the present invention has the reflective structure in the above-described aspect. In this way, a reflective structure having a desired reflection directivity with fewer variations is applied, which contributes to improvement in yield of the apparatus.

In this aspect, the optical reflective layer can be used as an electrode. In this way, the reflective structure is preferably applicable to a liquid crystal display device of reflective type or transflective type, and in particular to a display device of active matrix type or the like.

It should be noted that in the present specification and claims, the 'mesh portions' refer to convex or concave island areas of an optical reflective layer (or other equivalent related layer), separately scattered over a major surface of a reflective structure, while the 'net portion' is a so-called fringe portion which surround or delimit substantially all these island areas and refer to concave or convex continuous surrounding area of the optical reflective layer (or other equivalent related layer). This point will be further clarified in the following descriptions.

DESCRIPTION OF DRAWINGS

FIG. 1 is a plan view showing a plan structure of mainly an underlayer of an optical diffusing reflective structure according to a first embodiment of the invention.

FIG. 2 is a cross-sectional view of a structure taken along a line II-II of the optical reflective structure based on the structure shown in FIG. 1.

FIG. 3 is a series of model figures when widths of extendings of a net portion of a reflective layer are equal.

FIG. 4 is a series of model figures when a width of the first extending element of the reflective layer is larger than a width of the second extending element of the reflective layer.

FIG. 5 is a schematic perspective view for explaining a cross-shaped diffusive reflection directivity according to an embodiment of the invention.

FIG. 6 is a schematical illustration for explaining an effective reflective surface area per unit extending length of the first and second extending elements.

FIG. 7 is a schematic illustration showing an original pattern corresponding only to one mesh portion and a net portion surrounding it.

FIG. 8 is an illustration for explaining how to determine which of predetermined angular ranges an extending angle of an extending element of a net portion belongs to.

FIG. 9 is a schematic illustration showing a pattern obtained by changing a width of an extending element from the original pattern of FIG. 7.

FIG. 10 is an outline view showing an example of an application using a reflective structure according to the invention.

FIG. 11 is a schematic cross-sectional view showing a partial construction of a liquid crystal display device in another example of application of a reflective structure according to the invention.

FIG. 12 is a plan view showing a plan pattern of a foundational layer of a reflective structure according to the embodiment.

FIG. 13 is a plan view showing a plan pattern of a foundational layer of a reflective structure according to a comparison example.

FIG. 14 is a graph representing a directivity of an optical reflective layer of a reflective structure according to the embodiment.

FIG. 15 is a schematic illustration for explaining a directional angle of the reflective surface.

FIG. 16 is a plan view showing a plan structure of mainly an underlayer of an optical diffusing reflective structure according to a second embodiment having the reverse pattern.

FIG. 17 is a cross-sectional view of a structure taken along a line XVI-XVI of the optical reflective structure based on the structure shown in FIG. 16.

FIG. 18 is an outline view showing a further example of application using a reflective structure according to the invention.

FIG. 19 is an illustration for explaining a distribution form of frequencies of directional angles of a reflective surface of a reflective structure according to one modification.

FIG. 20 is an illustration for explaining a distribution form of frequencies of directional angles of a reflective surface of a reflective structure according to the other modification.

FIG. 21 is an illustration for explaining a distribution form of frequencies of directional angles of a reflective surface of a reflective structure according to a further modification.

FIG. 22 is a schematic illustration showing a still further example of application using a reflective structure according to the invention.

MODE FOR INVENTION

With reference now to the attached drawings, a mode for carrying out the invention will be described in detail by way of embodiments below.

FIG. 1 shows a plan structure of mainly an underlayer of an optical diffusing reflective structure according to a first embodiment of the invention and FIG. 2 shows a cross-section of the structure taken along a line II-II of the optical diffusing reflective structure based on the structure shown in FIG. 1.

This optical diffusing reflective structure 1 has an optical reflective layer 20 made of a metal material, for example, aluminum, supported by a substrate 10 as a base layer, whose surface is roughened, having light reflectivity and optionally electrical conductivity appropriate for a reflective electrode that will be described later in addition thereto. According to this embodiment, in order to roughen the surface of the optical reflective layer 20, that is, to form an uneven surface thereof, the reflective structure 1 further takes form of having an underlayer 30 to form projections and depressions of the optical reflective layer 20 in the underlayer thereof. The underlayer 30 here includes a foundational layer 31 forming base for the projections and depressions and an overcoat layer 40 which covers the layer 31 so as to make the uneven surface relatively smooth. These foundational and overcoat layers are made of materials suitable for patterning and have an electrically insulating property, for example, photo-sensitive resins, which are patterned through a process based on the well-known photolithography.

The foundational layer 31 consists of mesh portions 3h arranged in mesh form each having a shape of a cave and a net portion 3M continuously extending around these mesh portions 3h in net form and having a shape of a rise. The mesh portions 3h of the foundational layer 31 are openings with the foundational layer material completely removed in this example (see FIG. 2), but may also have a shape of a recessed hole with the material of a certain thickness remaining. In this case, the overcoat layer 40 may be omitted.

As shown in FIG. 1, the net portion 3M of the foundational layer 31 is classified in a plan view into first extending elements Po extending in a predetermined first direction #1 and a second direction #2 that intersects the first direction at substantially right angles and second extending elements Ps extending in predetermined third and fourth directions #3 and #4, that is, directions forming an angle of substantially 45° with respect to the first and second directions. Each of the first extending elements Po extends in the first or second direction with substantially constant widths and each of the second extending elements Ps also extends in the third or fourth direction with substantially constant widths.

Another major feature of the present invention is that the width of the first extending element Po of the net portion 3M is larger than the width of the second extending element Ps. That is, as shown in FIG. 1, the width Wo1 of the first extending element Po extending along the first direction #1 and the width Wo2 of the first extending element extending along the second direction #2 are larger than the width Ws3 of the second extending element extending along the third direction #3 and the width Ws4 extending along the fourth direction #4.

In this embodiment, while satisfying conditions of the widths of such extending elements, the widths of the respective extending elements are designed to have arbitrary values within the allowable range in manufacture, but it is also possible to set the widths for the first extending elements Po and second extending elements Ps to unified specified values respectively.

The overcoat layer 40 is layered over the entire upper surface of the foundational layer 31 formed in this way and the optical reflective layer 20 is further layered thereover. Therefore, while the optical reflective layer 20 generally has a plan pattern analogous to the plan patterns of the foundational layer 31 and overcoat layer 40, the surface of the optical reflective layer 20 is roughened in accordance with to projections and depressions (surface roughness) based on the net portion 3M and mesh portions 3h of the foundational layer 31 but reduced to a certain degree by the overcoat layer 40.

Thus, the optical reflective layer 20 has mesh portions 2h arranged in mesh form and having a shape of cave and net portion 2M continuously extending around these mesh portion 2h in net form and having a shape of rise, taking their forms of corresponding to the above-described mesh portions 3h and net portion 3M respectively. The net portion 2M of the optical reflective layer 20 is classified in a plan view into first extending elements Po' extending in the first and second directions #1 and #2 and second extending elements Ps' extending in directions forming an angle of substantially 45° with respect to the first and second directions, also taking their forms of corresponding to the first and second extending elements Po, Ps mentioned above. FIG. 1 shows boundaries between the net portion 2M and the mesh portions 2h of the optical reflective layer with dotted lines.

Furthermore, the first and second extending elements Po', Ps' of the net portion 2M of the optical reflective layer 20 also have substantially constant widths respectively because the first and second extending elements Po and Ps of the foundational layer 31 have substantially constant widths. Furthermore, the width of the first extending element Po' of the net portion 2M of the optical reflective layer 20 is greater than the width of the second extending element Ps' of the net portion 2M of the optical reflective layer 20 because the width of the first extending element Po of the net portion 3M of the foundational layer 31 is greater than the width of the second extending element Ps.

The reflective structure 1 having such a structure according to this embodiment provides diffusing reflection characteristics having a cross-shaped directivity when the major surface of the reflective structure is viewed from the front as will be described below.

FIGS. 3 and 4 show surface models of the reflective layer 20 for explaining such a cross-shaped directivity.

FIG. 3 shows a series of models when widths of extending of the net portion 3M (2M) of the foundational layer 31 (reflective layer 20) are equal and the left figure (a) of FIG. 3 schematically shows parts of the second extending elements Ps' of the net portion 2M of the reflective layer 20 along the third and fourth directions #3, #4 as representative examples. When parallel rays of light is incident from, for example, the front onto the second extending element Ps' in (a) of FIG. 3, the light reflected from the extending element has an intensity distribution symmetric with respect to a center axis A of the extending element. Therefore, the reflected light distribution of the second extending element Ps' is a synthesis of the distribution characteristic (dotted line) in the third direction #3 and the distribution characteristic (solid line) in the fourth direction #4 as schematically shown in the graph in the lower part of (a) of FIG. 3. This graph shows visual angles within a virtual plane which extends along the respective directions and which is normal to the major surface of the substrate 10 on the horizontal axis and intensity of the reflected light on the vertical axis. Here, only the second extending element Ps' is illustrated, but light reflection by the first extending element Po' should also be actually considered. Since the first extending element Po' extends at 45° with respect to the third and fourth directions #3, #4, a characteristic corresponding to the sum total of the two distribution curves shown in (a) of FIG. 3 and two distribution curves obtained by rotating these curves by 45° about to the vertical axis can be substantially deemed to be the reflected light distribution characteristic of the whole of the first and second extending elements Po', Ps'.

Based on these considerations, when the extending widths of the first and second extending elements Po', Ps' are equal, the optical reflective layer 20 can be deemed to diffuse and reflect light as an optical reflective protruding body in shape of a truncated-cone-like body (or a cone whose apex is spherical) as shown in (b) of FIG. 3. Light is reflected from this protruding body uniformly in all directions as symbolically expressed with arrows in the plan view shown in (c) of FIG. 3.

In contrast, FIG. 4 shows a series of models when the width of the first extending element Po' of the net portion 2M of the reflective layer 20 is larger than the width of the second extending element Ps' of the net portion. (a) of FIG. 4 schematically shows part of the first extending element Po' of the reflective layer 20 along the first and second directions #1, #2 as representative examples. When parallel rays of light is likewise incident onto the first extending element Po' in (a) of FIG. 4, as in the case of FIG. 3, it is possible to consider the reflected light distribution obtained taking into account the reflected light distribution in all the extending elements including the second extending elements Ps', but it should be noted here that the width of the first extending element Po' is set to a large value.

That is, because the width of the first extending element Po' is greater, the area of the surface of the first extending element Po' which reflects incident light also increases and the proportion of light reflected on the first extending element Po' out of all the incident light increases compared to that of the second extending element Ps'. In other words, when diffusion and reflection in the entire region of the reflective structure 1 is considered, diffusion and reflection by the first extending elements Po' becomes more dominant over diffusion and reflection by the second extending elements Ps'.

Therefore, when the width of the first extending element Po' is greater than the width of the second extending element Ps' as in the case of this embodiment, the optical reflective layer 20 is considered to diffuse and reflect light through a deformed protruding body (octagonal pyramid-like body) as shown in (b) of FIG. 4, obtained by cutting away the light reflective protruding body in a truncated cone shape in FIG. 3(b) with the two opposed planes B including a straight line parallel to the first direction #1 and parallel to a generatrix line of the truncated cone and cutting away it with the two opposed planes C including a straight line parallel to the second direction #2 and parallel to a generatrix line of the truncated cone. Light is reflected from this deformed protruding body in such a manner that the light is biased in favor of the first and second directions #1, #2 as symbolically expressed with arrows in the plan view shown in (c) of FIG. 4. That is, this deformed protruding body reflects more light in the first and second directions #1, #2 and reflects less light in the third and fourth directions #3, #4. It can be interpreted that the cut planes B, C of this deformed protruding body relatively increase the reflected light in the first and second directions #1, #2 compared to the reflected light in the third and fourth directions #3, #4.

In this way, a directional distribution of reflected light with relatively high intensity is formed in a cross shape as shown by a dotted line D in (c) in FIG. 4.

Although the optical reflective layer 20 also diffuses and reflects light in the mesh portions 2h, these mesh portions 2h can also be considered to basically have a curved surface similar to that of the extending elements of the net portion 2M, so that the mesh portions 2h likewise contributes to the cross-shaped directional distribution of high intensity reflected light. What is important is a curved surface around the boundary between the net portion and mesh portion, and increasing the width of the first extending element can also increase the effective reflective surface area of the curved surface around the boundary and increase the amount of reflected light in a direction orthogonal to the extending direction of the first extending element.

Thus, increasing the width of the first extending element Po' compared to that of the second extending element Ps' is equivalent to forming the above-described sections B, C and as the width is relatively increased, the area of the section increases and the amount of light reflected on the first extending element Po' increases.

As shown in FIG. 5, when the major surface of the reflective structure 1 is viewed along any lines of sight along two orthogonal planes $1p$, $2p$ which stands vertically on the major surface of the reflective structure 1 and which are parallel to the first and second directions #1, #2 respectively, this embodiment is intended to obtain stronger reflected light than when viewed from other directions. Therefore, by increasing the width of the first extending element Po' extending along the first and second directions #1, #2 compared to widths of others, the area of the reflecting surface in the desired reflecting directions (cut surfaces B, C in the model shown in FIG. 4(b)) are increased to thereby increase diffused reflected light along the lines of sight parallel to the orthogonal planes $1p$, $2p$. The distribution of reflected light obtained in this way has a cross shape in a plan view, and therefore such a distribution is referred to as a 'cross-shaped directivity' in this specification.

It is noted that the above-described widths Wo1, Wo2, Ws3, Ws4 may be widths at the bottom of the net portion 3M, or as shown in FIG. 2, the widths may also be the width (Wo1') in the plane obtained by cutting the net portion with a virtual surface parallel to the major surface of the substrate 10 at a position a predetermined distance d away from the bottom of the net portion 3M. According to the definition of the width of the net portion in the latter case, even if the height of the apex of the net portion 3M is not uniform for the reason that the surface of the substrate is not flat, it is possible to set the width of the net portion 3M appropriately.

The foregoing description has been made about an embodiment in which the shape and width of the extending element of the net portion 2M of the optical reflective layer 20 are defined based on the shape and width of the extending element of the net portion 3M of the foundational layer 31, but it is also possible to adopt an embodiment intended to provide an uneven underlayer structured as a single layer, instead of a two-layer structure of the foundational layer 31 and overcoat layer 40 or an embodiment intended to form desired projections and depressions in the surface of the optical reflective layer alone without the underlayer itself. In such an alternatives, the width of the corresponding net portion can be defined in the same sense as explained using the distance d. That is, if the net portion of the reflective layer can be defined so as to implement the features specific to the present invention as a consequence, it is possible to define the width as a width of the plane obtained by cutting the net portion with a virtual plane parallel to the major surface of the substrate at a position distant by d from the apex of the net portion of the layer whose width is to be defined.

Furthermore, the relationship between the first extending element and the second extending element and the extending forms thereof are defined using the values of the widths, but it is also possible to adopt other form parameters of the extending elements in place of the widths as appropriate. Even in the case where the other form parameters are used, if they correspond to equivalent values to possess the features specific to the present invention consequently, such a construction with those parameters should be understood as possessing a technical concept of the present invention. The essence of the definition using the widths of the extending elements and other parameters can be summarized as follows.

For example, changing the width of an extending element means changing the rate of the effective reflective surface area thereof. More specifically, when the first extending element Po' and the second extending element Ps' are aligned, it is obvious that the surface area per unit extending length Lo of the first extending element Po' having a width WI is greater than that of the second extending element Ps' having a smaller width W2 as shown in FIG. 6. Since reflection of incident light becomes dominant at locations with a large surface area, the proportion of reflection is greater in the first extending element Po' than the second extending element Ps'. Consequently, to bias the reflected light in a desired direction (#1 in the shown example), the effective reflective surface area per unit extending length of the extending element which extends in the direction (#2 in the shown example) perpendicular to the desired direction should be increased. Since the desired directions are the first and second directions #1, #2 in this embodiment, the effective reflective surface areas per unit extending length of the respective first extending elements Po' extending in these directions are increased. On the contrary, when the reflected light is biased only in one of the first and second directions #1, #2, the effective reflective surface area per unit extending length for only the extending element which extends in the corresponding one direction may be increased.

So far, the case where the net portion is classified into two types; the first extending element Po (Po') extending in the vertical or horizontal direction and the second extending element Ps (Ps') extending in a diagonal direction, and the former has a larger width than the latter. However, especially when the sizes and shapes, etc., of the mesh portions are set randomly, there are practically a variety of extending directions of the net portion, so that the extending directions of the net portion can not exactly correspond to the first to fourth directions #1 to #4.

For this reason, in this embodiment, the following schemes are adopted in designing patterns of the net portion and mesh portions.

FIG. 7 is depiction of the original pattern elements 3*h*', 3M' corresponding to one mesh portion 3*h* and the net portion 3M which surrounds the mesh portion 3*h*. This original pattern takes a form in which one mesh portion 3*h*' is surrounded by a net portion 3M' of equal width. Here is shown a form as one example in which the mesh portion 3*h*' is heptagonal and the net portion 3M' has seven nodes. The extending direction of an element between the nodes of the net portion 3M', that is, a net portion segment is determined using a predetermined direction x, for example, one orientation of the second direction #2 as a reference. FIG. 7 shows how to decide the extending directions of net portion segments to be determined first and a net portion segment to be determined next, wherein it is determined that the first and next segments are extended at 57° and 108° with respect to the predetermined direction x, respectively. For other net portion segments, their angles with respect to the predetermined direction x (hereinafter referred to as 'extending angle') are decided likewise.

Once the extending angles of all net portion segments are determined, it is determined to which part of a predefined angle range these extending angles belong. FIG. 8 shows such an angle range, wherein the angles are categorized into two types: (90°×n)±A [n=0, 1, 2, 3], that is, subranges of 0°±A, 90°±A, 180°±A, 270°±A; and 45°±(90°×n)±B [n=0, 1, 2, 3], that is, subranges of 45°±B, 135°±B, 225°±B, 315°±B, where B=45°−A. As a value of A, good results are obtained using 22.5° which is half of 45°, but any other values may be used as well.

The four subranges which belong to the first type o are ranges of peripheral angles centered on 0°, 90°, 180°, 270° corresponding to the first and second directions #1, #2. Net portion segments having extending angles which fall within these sub ranges are regarded as extending in the horizontal direction or vertical direction. On the other hand, the four subranges which belong to the second type s are ranges of peripheral angles centered on 45°, 135°, 225°, 315° corresponding to the third and fourth directions #3, #4. Net portion segments having extending angles which fall within these ranges are regarded as extending in diagonal directions.

In this way, based on the result of determination on to which type subrange an extending angle belongs, the width of the net portion segment which has the extending angle is decided. More specifically, any net portion segments which belong to the type o are decided to generally extend parallel to the first and second directions #1, #2, that is, vertically and horizontally and the widths thereof are made to be relatively increased, while any net portion segment which belong to the type s are decided to generally extend parallel to the third and fourth directions #3, #4, that is, diagonally and the widths thereof are made to be relatively decreased. As a result of this, a pattern derived from the original pattern in FIG. 7 becomes one shown in FIG. 9.

As is evident from FIGS. 7 and 9, the width of a net portion segment having an extending angle of 108° and belonging to the type o is greater than the width of a net portion segment having an extending angle of 57° and belonging to the type s. In this example, the width of the net portion 3M' of the original pattern is regarded as a maximum one and the width of a net portion segment belonging to the type o is kept as is, and only the width of a net portion segment belonging to the type s is reduced, or more specifically, the width is reduced to approximately a half of the maximum width. However, the width ratio may be in other reduction ways such as 4:3, 5:4, which lead to results.

Thus, by performing decision and classifying about to which of the first to fourth directions #1 to #4 the net elements having various extending angles belong, it is possible to decide elements of the net portion whose widths should be increased or elements of the net portion whose widths should be decreased.

In an optical diffusing reflector plate 100 as a product using such a reflective structure, it is possible to set the first to fourth directions #1 to #4 as shown in FIG. 10. An example shown in FIG. 10 constitutes a system in which an ornament 200 including a picture, advertisement or the like having transparency and coloration such as stained glass is placed in front of the optical diffusing reflector plate 100 and the ornamental features are displayed to a viewer 300. In such a system, after the external light passes through the ornament 200, it reaches the optical diffusing reflector plate 100 and the light diffused/reflected here passes through the ornament 200 again and is guided to the outside.

As is evident from FIG. 10, the first and second directions #1, #2 correspond to the vertical and horizontal directions when the ornament 200 is viewed from the front. In this way, even when the viewer 300 moves in the vertical or horizontal directions to change the visual angle with respect to the ornament 200 vertically or horizontally, the viewer 300 can see bright decoration.

A situation in which the viewer 300 moves in the vertical direction and sees the ornament 200 is, for example, in an elevator system of such a type that a transparent glass plate is provided in the wall of an elevator box to allow the viewer to see outside through the glass plate. That is, when the ornament 200, to the back of which the diffusing reflector plate 100 is pasted as shown in FIG. 10, is posted on the inner wall of a room which forms the space through which the elevator box moves, passengers in the elevator can see this ornament 200 through the glass plate. In this case, since the optical diffusing reflector plate 100 has a high reflective intensity distribution in the vertical direction as described above, the passengers can see bright and prominent decorations even during ascent/descent elevating operation.

FIG. 11 shows another application example of the above-described optical diffusing reflective structure wherein the optical diffusing reflective structure is applied to a liquid crystal display device.

FIG. 11 mainly shows a relationship between the above-described reflective structure and a TFT (thin-film transistor) built in the liquid crystal display device as a pixel driving element.

In FIG. 11, a TFT 102 includes source and drain electrodes 71 and 72 formed on a substrate 8 and a semiconductor layer 73 formed so as to contact and span both electrodes. The source electrode 71 is constructed of a transparent conductive film 7$t$ and a metal film 7$m$ stacked thereon. The semiconductor layer 73 is covered with a gate insulating film 74 and a gate electrode 75 is stacked thereon.

The gate insulating film 74 forms a contact hole 72$h$ for connection of the drain electrode 72. After the TFT 102 is formed, the above-described underlayer 30 is formed. More specifically, the foundational layer 31 is formed in almost the entire display area of the liquid crystal display device leaving only the net portion 3M and the overcoat layer 40 is deposited on the foundational layer 31. Both the foundational layer 31 and overcoat layer 40 are patterned so as to exclude the contact hole 72$h$ of the drain electrode 72. Then, an optical reflective layer 20 is formed over the underlayer 30 created in this way. Here, the optical reflective layer 20 is formed of a material having not only a light reflective characteristic but also electrical conductivity to allow electrical connection with the drain electrode 72.

The optical reflective layer 20 roughened in this way is formed as a pixel electrode connected to the TFT 102. According to this embodiment, the optical reflective layer 20 diffuses and reflects light introduced through an opposed substrate 91 and a liquid crystal layer 92 and can function as a pixel electrode which is means for providing potential to a display unit area portion of the liquid crystal layer 92 or a pixel area.

FIG. 11 only shows part of the structure, but this structure is repeatedly formed over the entire display area of the liquid crystal display device.

Here, roughening the pixel electrode to provide optical diffusing properties and realizing a liquid crystal device of reflective type or transflective type itself is a known technique, so its details will not be described any more. Moreover, not only the substrate 91 and liquid crystal layer 92 but also various layers and films are normally used, but the use of these materials will be left for descriptions in various publicly known documents and will be omitted here.

FIG. 12 shows a plan pattern of the foundational layer 31 of the reflective structure 1 according to this embodiment applied to the liquid crystal display device as shown in FIG. 11. To be compared to this FIG. 12, FIG. 13 shows an example where all the widths of extendings of the net portion 3M are set to be equal and constant. A comparison between FIG. 12 and FIG. 13 leads to visually easy understanding of features of this embodiment. The areas shown with dotted lines in FIGS. 12 and 13 correspond to the areas occupied by the pixel electrodes, but these are shown only to facilitate a comparison between the size of the pixel electrode area and the sizes of individual meshes of the pattern, but do not express a pattern form specific to the pixel electrode.

FIG. 14 shows a directivity of the optical reflective layer 20 of the reflective structure 1 according to this embodiment, wherein the x and y axes that intersect each other at right angles refer to directional angles of 0°, 90°, 180° and 270° at both ends thereof. As shown in FIG. 15, when the surface shape of the optical reflective layer is expressed as a hemisphere whose circular cross section constitutes the bottom parallel to the major surface of the substrate, a directional angle mentioned herein means an angle θ defined by a straight line obtained by projecting the normal N standing on any spherical surface of the hemisphere perpendicularly onto the surface parallel to the bottom and a reference direction (right end of x in this example).

FIG. 14 only shows the first quadrant in detail, but directivity values were measured in increments of 15° for all 360° directional angles. The solid curve (case 1) in FIG. 14 shows the characteristic of the reflective structure according to this embodiment and the dotted line (case 2) shows the characteristic of the reflective structure when the widths of the extending elements of the net portion shown in FIG. 13 are equal.

As such directivity values, the entire uneven surface of the optical reflective layer 20 of the reflective structure 1 is divided into many small squares and values based on data summarizing orientations of surfaces of all squares is adopted. More specifically, the value is obtained about how many squares of a total of S squares have the same directional angle θ. When the number of squares having the same directional angle θ is S1, the value of S1/S is used which corresponds to the ratio, that is, frequency (directional angle frequency of reflective surface) at which reflective surfaces with the directional angle θ exist on the entire uneven surface of the optical reflective layer. The graph of FIG. 14 takes a polar coordinate system in which a value of the directional angle frequency of the reflective surface increases in proportion to the distance from the origin at all directional angles.

As is evident from FIG. 14, the reflective structure in this embodiment has a cross-shaped distribution with extremely higher frequencies of the reflective surfaces at directional angles of 0°, 90°, 180° and 270° than other directional angles. On the other hand, it is observed that the reflective structure (dotted line) with extending elements of the net portion being uniform has a uniform distribution of reflective surfaces for all directional angles.

Such a cross-shaped distribution of reflective surfaces means that light is reflected from the surface of the reflective structure biasedly toward the directional angles of 0°, 90°, 180° and 270°.

In case 1, the widths of the first and second extending elements Po, Ps of the net portion 3M of the foundational layer 31 were set to approximately 4 μm, 2 μm, respectively and in case 2, the widths of all the extending elements of the net portion were set to approximately 4 μm. Furthermore, in both cases, the pitch between centers of the mesh portions was approximately 12 μm, and the overcoat layer and optical reflective layer had a constant film thickness.

Although the above-described embodiment has a pattern having caves and rise for the mesh portions and net portion, the reverse way may be used in which a reverse pattern having rises and cave are used for the mesh portions and net portion, respectively.

FIG. 16 shows a plan structure of mainly an underlayer of an optical diffusing reflective structure 1' according to a second embodiment having the reverse pattern, and FIG. 17 shows a cross-section taken along a line XVI-XVI of the optical reflective structure based on the structure shown in FIG. 16.

In this embodiment, net portion 3M' of a foundational layer 31' are concave and mesh portions 3h' are convex, and therefore the net portion 2M' and mesh portions 2h' of the optical reflective layer 20 are also concave and convex, respectively in a form reflecting these forms of 3M', 3h'. Here, the widths of the first extending elements Po of the net portion 3M' are greater than the widths of the second extending elements Ps, but these widths are defined as distances between protruding bodies of the foundational layer 31' in this embodiment.

Also in the reflective structure in such a form, the curved surface which reflects light itself can be expressed with the models explained with reference to FIGS. 3 and 4, and therefore the above-described effects and advantages can be expected likewise. Furthermore, a technique for setting widths of the extending elements of the net portion as explained with reference to FIGS. 7 to 9 is also applicable likewise.

The above-described mesh portions 3h, 3h' having a substantially polygonal shape in plan view as shown in FIGS. 1 and 16 have some advantages in the pattern design, but the mesh portions need not always be polygonal.

The above-described embodiments have been described about a mode in which the effective reflective surface area of an extending element is defined by one structural parameter of width, but in addition, there are also methods of defining the effective reflective surface area by the areas of the extending elements appearing in the plan view or defining the effective reflective surface area by the heights and/or depths as described below.

That is, when the net portion as shown in FIG. 1 forms a convex body, it is also possible to change the effective reflective surface area by the heights of the extending elements of the net portion instead of widths. In this case, it is preferable to define the individual heights of extending elements relative to the lowest point of the neighboring mesh portions (or a plane including lines connecting the respective lowest points of peripheral mesh portions). When defining such heights, any appropriate target layer (any one of the foundational layer 31, overcoat layer 40 and reflective layer 20) is defined so that a net portion of the reflective layer is defined so as to implement the features specific to the present invention as in the case of the above-described definition of widths.

When a net portion form a concave body as shown in FIGS. 16 and 17, it is possible to change the effective reflective surface area on the basis of the depths of extending elements of the net portion instead of widths. In this case, it is preferable to define the individual depths of the extending elements relative to a peak of the neighboring mesh portions (or a plane including lines connecting the respective peaks of the peripheral mesh portions). When defining such depths, depths of any target layer (any one of foundational layer 31', overcoat layer 40 and reflective layer 20) are defined as appropriate.

The above-described embodiments have been described about those having the so-called orthogonal cross-shaped diffusing reflection directivity and an equivalent reflected light distribution in four directions of high intensity reflected light. Such a directivity is preferred in the a case as shown in FIG. 18 where a liquid crystal display panel of a portable electronic device such as a cellular phone with a digital camera has a rotatable mechanism. In this example, the device includes a liquid crystal display panel of reflective type or transflective type according to the present invention as explained in FIG. 11. The first and second directions #1, #2 correspond to the vertical and horizontal directions of the screen for use during a normal operation as shown in FIG. 18(*a*), while when an image is taken using the digital camera, the display panel is turned by 90° as shown in FIG. 18(*b*) with the first and second directions #1, #2 corresponding to the horizontal and vertical directions to be used as a monitor screen. As described before, high intensity reflected light is obtained in the first and second directions #1, #2, and therefore the user can see a bright and high quality display image both during the normal operation and when an image is taken after the display panel is turned by 90°.

Here, making the reflection directivity along the first and second directions #1, #2 which differ from each other by 90° has specific effects in any one of modes of use in FIG. 18(*a*) and (*b*). That is, with such a device, the user often sees the screen with visual angles along the longitudinal direction and horizontal direction, and seldom sees the screen from diagonal direction, and therefore it is extremely useful in practice to bias the reflected light in the first and second directions #1, #2 while sacrificing the reflected light in the third and fourth directions #3, #4.

On the other hand, according to the present invention, it is also possible to introduce various modes other than such directivities.

Hereinafter, modifications for realizing directivities other than the orthogonal cross-shaped directivity explained so far will be explained with reference to FIGS. 19, 20 and 21. These figures are following FIGS. 14 and 15, wherein use is made of an axis indicating a reference direction x and another axis indicating another reference direction y which forms 90° with respect to the direction x.

FIG. 19 shows an orthogonal cross-shaped directivity whose first direction #1 and second direction #2 have different distribution forms of reflective surface frequencies. Moreover, in this directivity, the first and second directions #1, #2 in which the reflected light should be biased are deviated from the reference direction by pre-determined angles $\theta 1$, $\theta 2$, respectively.

As is evident from FIG. 19, the reflective surface frequency in the first direction #1 is higher than that in the second direction #2 and the reflected light in the first direction #1 has higher intensity than the reflected light in the second direction #2. Furthermore, this shows a cross-shaped distribution as thought to be turned from the one shown by the solid line in FIG. 14 by 45°.

It is possible to obtain such a directivity by causing the extending elements of the net portion mainly having reflective surfaces capable of having the normal (see FIG. 15) having directional angles falling within a first range p of $\theta 1 + 180° \times n \pm \alpha$ [n=0, 1] and a second range q of $\theta 2 + 180° \times n \pm \beta$ [n=0, 1] to have larger effective reflective surface areas per unit extending length than those of the other extending elements. In this example, there is assumed $0 < \theta 1 < 90°$, $90° < \theta 2 < 180°$, $\theta 2 - \theta 1 = 90°$, $\alpha > \beta$. $\alpha$ corresponds to the directional angle of the normal to determine the range of the extending elements (hereinafter, referred to as '$\theta 1$ extending element') having a reflective surface capable of having the normal of a directional angle which belongs to the first direction #1 centered on the direction of $\theta 1$, and $\beta$ corresponds to the directional angle of the normal to determine the range of the extending elements (hereinafter, referred to as '$\theta 2$ extending element') having a reflective surface capable of having the normal of a directional angle which belongs to the second direction #2 centered on the direction of $\theta 2$.

$\alpha > \beta$ is one condition for setting directional angle frequencies of a reflective surface in the first direction #1 to be higher than those in the second direction #2. Another condition is achieved by setting an effective reflective surface area of the θ1 extending elements which belong to the first range p to be grater than that of the θ2 extending elements which belong to the second range q. These conditions may be realized in combination.

In this example, the θ1 extending element generally becomes the extending element extending in the second direction #2 and the θ2 extending element generally becomes the extending element extending in the first direction #1. Lower parts in FIG. 19 show this clearly, in which hemicylindrical bodies represent extending elements, following the models in FIG. 3, respectively. Any normal standing on the reflective surface of the extending element $p_{01}$ which extends in the second direction #2 exists within a perpendicular plane that is expressed by a dotted line and is parallel to the first direction #1, and any normal standing on the reflective surface of the extending element $p_{74\_2}$ which extends in the first direction #1 exists within a perpendicular plane that is expressed by a dotted line and is parallel to the second direction #2. Therefore, the respective extending elements which belong to the first and second ranges p, q include the extending elements whose extending directions are deviated from the lower parts in FIG. 19 by angles $\pm\alpha$ and $\pm\beta$, respectively.

As is evident from the above, this embodiment is intended to determine the effective reflective surface area based on whether the target extending element mainly has the reflective surface capable of having the normal having directional angles which fall within the first and second ranges p, q or not. This corresponds to a generalization of the embodiment explained before with reference to FIGS. 7 to 9 in which the widths of the extending elements are determined based on the extending directions of the extending elements.

To make the reflective surface frequencies about the first direction #1 equal to that about the second direction #2, $\alpha=\beta$ is set. Both $\alpha$ and $\beta$ preferably have values of approximately 45°/2=22.5°, and in particular may be set, for example, within a range from 10° to 35°. The example where $\alpha=\beta=22.5°$ corresponds to the mode shown in FIG. 14, wherein both the extending elements belonging to the first direction #1 and the extending elements belonging to the second direction #2 have the same effective reflective surface area (have the same width), so that the distributions of frequencies of directional angles of the reflective surfaces in both directions are the same.

FIG. 20 shows a directivity (solid line) in which superiority and inferiority in the distribution of directional angle frequencies of the reflective surface are reversed between the first direction #1 and second direction #2 and the distribution range is turned by 45°, a directivity (single-dot dashed line) in which only the frequencies of directional angles of the reflective surface in the second direction #2 are increased and a directivity (dotted line) in the same form as that in FIG. 14.

To obtain the directivity indicated by the solid line, θ1 and θ2 in the above expression are set to 0° and 90°, respectively and $\beta>\alpha$ is set. Instead of setting $\beta>\alpha$ or in addition thereto, it is also possible to set a greater effective reflective surface area of the θ2 extending element than that of the θ1 extending element.

To obtain the directivity indicated by the single-dot dashed line, θ1 and θ2 in the above expression are set to 0° and 90°, respectively and $\beta>>\alpha$ is set, that is, $\beta$ is set to a value much greater than $\alpha$. Instead of setting $\beta>>\alpha$ or in addition thereto, it is also possible to set a much greater effective reflective surface area of the θ2 extending element than that of the θ1 extending element. Unlike those about the two directions explained so far, this directivity has a distribution of high reflective surface frequencies only for a single direction. Such a directivity is preferably used for an apparatus requiring strong reflected light only in the vertical direction or only in the horizontal direction of the screen, for example.

FIG. 21 shows the case where the first direction #1 does not intersect the second direction #2 at right angles, wherein distributions of frequencies of the reflective surface are the same in both of the directions.

To obtain such a directivity, $\theta2-\theta1>90°$ and $\alpha=\beta$ are set in the above expressions. Here, the effective reflective surface area of the θ1 extending element is equal to that of the θ2 extending element. To make the distribution of frequencies of the reflective surface in the first direction #1 different from that in the second direction #2, $\alpha\neq\beta$ should be set, or in order to make the equivalent effects an effective reflective surface area may be set appropriately.

Here, the directivity shown in FIG. 21 is preferably used for an application shown in FIG. 22. FIG. 22 shows a mode of use of the liquid crystal display device of reflective type or transflective type shown in FIG. 11 provided with the reflective structure according to the present invention constructed so as to have the directivity. In this display device, the first and second directions #1, #2 are set in the diagonal directions of the screen, and the position of the user is semi-fixed to locations at which the user generally sees an image displayed on the screen in these directions. A more concrete example of this is a system in which this display device is placed in the center of an automobile room. In such a mode of use, lines of the sight of the users do not intersect with one another at right angles with respect to the screen and their visual angles are substantially fixed within some relatively narrow range, which is convenient because it is possible to display a bright and good image in the diagonal directions of the screen.

Several typical embodiments of the present invention have been described so far, but those skilled in the art can modify these embodiments in various ways as required without departing from the spirit of the invention defined in the claims thereof.

INDUSTRIAL APPLICABILITY

The present invention is applicable to a reflective structure having an optical diffusively reflecting function and an apparatus using it.

The invention claimed is:

1. An optical diffusing reflective structure having an optical reflective layer whose surface is roughened, wherein:
   the optical reflective layer comprises mesh potions arranged in mesh form and each having one shape of a cave and a rise and a net portion continuously extending around these mesh portions in net form and having the other shape of a cave and a rise;
   the net portion is classified in a plan view into first extending elements extending in a predetermined first direction and in a second direction that intersects the first direction at a predetermined angle and second extending elements extending in midway directions between the first and second directions;
   the first and second extending elements have the respective substantially constant widths; and
   elements of the first elements extending in at least one of the first and second directions are greater in effective reflective surface area per unit extending length than the second extending elements.

2. A reflective structure as defined in claim 1, wherein elements of the first extending elements extending in the first direction differ in effective reflective surface area per unit extending length from elements of the first extending elements extending in the second direction.

3. A reflective structure as defined in claim 1, wherein the midway direction is an angular direction bisecting an angle enclosed by the first direction and the second direction.

4. A reflective structure as defined in claim 1, wherein the predetermined angle is 90°.

5. A reflective structure as defined in claim l, wherein the predetermined angle is not 90°.

6. A reflective structure as defined in claim 1, wherein the effective reflective surface area is defined by a width of the extending element.

7. A reflective structure as defined in claim 1, wherein the first and second directions correspond to a horizontal direction and a vertical direction in a front view of a major surface of the reflective structure.

8. A reflective structure as defined in claim 1, wherein the mesh portion has substantially a polygon shape in a plan view.

9. A reflective structure as defined in claim 1, wherein there is provided an uneven underlayer for defining a shape of roughened surface of the optical reflective layer under the optical reflective layer.

10. A reflective structure as defined in claim 1, wherein the first and second extending elements consist of extending elements having reflective surfaces on which the normal can stand at any directional angle within ranges of $\theta 1+180°\times n\pm\alpha$ and $\theta 2+180°\times n\pm\beta (n=0,1)$, respectively, where $\theta 1$ and $\theta 2$ are directional angles corresponding to the first and second directions, respectively, and $\alpha$ and $\beta$ are predetermined angles larger than 0°, respectively.

11. An apparatus comprising a reflective structure as defined in claim 1.

12. An apparatus as defined in claim 11, wherein the optical reflective layer is used as an electrode.

13. An optical diffusing reflective structure comprising an optical reflective layer that comprises mesh portions and a net portion surrounding the mesh portions, wherein:

each mesh portion has a shape of one of a cave and a rise, and the net portion has a shape of the other one of a cave and a rise, the net portion has a plane in which first extending elements extend in a predetermined first direction and a second direction that intersects the first direction in a predetermined angle, and in which second extending elements extend in midway directions between the first and second directions, and the first and second extending elements each has a respective substantially constant width.

14. The optical diffusing reflective structure as in claim 13, wherein the first extending elements extending in at least one of the first and second directions are greater in effective reflective surface area per unit extending length than the second extending elements.

15. The optical diffusing reflective structure as in claim 14, wherein the first extending elements extending in the first direction differ in effective reflective surface are per unit extending length from the first elements extending in the second direction.

16. The optical diffusing reflective structure as in claim 13, wherein the midway direction is an angular direction bisecting an angle enclosed by the first direction and the second direction.

17. The optical diffusing reflective structure as in claim 14, wherein the effective reflective surface area is defined by a width of the extending element.

18. The optical diffusing reflective structure as in claim 13, wherein the first and second directions correspond to a horizontal direction and a vertical direction in a front view of a major surface of the reflective structure.

19. A liquid crystal display apparatus, comprising an optical diffusing reflective structure as defined in claim 13.

20. The liquid crystal display apparatus as defined in claim 19, wherein the optical reflective layer is an electrode used to control a liquid crystal layer.

* * * * *